US011603733B2

(12) United States Patent
Jaaskelainen et al.

(10) Patent No.: US 11,603,733 B2
(45) Date of Patent: Mar. 14, 2023

(54) WELLBORE FLOW MONITORING USING A PARTIALLY DISSOLVABLE PLUG

(71) Applicant: Halliburton Energy Services, Inc., Houston, TX (US)

(72) Inventors: Mikko K. Jaaskelainen, Houston, TX (US); Cole Aaron Grandjean, Santa Fe, NM (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/154,837

(22) Filed: Jan. 21, 2021

(65) Prior Publication Data

US 2022/0228458 A1 Jul. 21, 2022

(51) Int. Cl.
*E21B 33/12* (2006.01)
*E21B 47/107* (2012.01)
*E21B 47/06* (2012.01)
*E21B 47/103* (2012.01)
*F16L 55/11* (2006.01)
*E21B 43/11* (2006.01)

(52) U.S. Cl.
CPC .......... *E21B 33/1208* (2013.01); *E21B 47/06* (2013.01); *E21B 47/103* (2020.05); *E21B 47/107* (2020.05); *E21B 43/11* (2013.01); *E21B 2200/08* (2020.05); *F16L 55/11* (2013.01)

(58) Field of Classification Search
CPC ...... E21B 33/00; E21B 33/1208; E21B 33/12; E21B 47/06; E21B 47/07; E21B 47/103; E21B 47/107; E21B 2200/08; E21B 43/26; E21B 43/2605; E21B 43/2607; E21B 43/27
See application file for complete search history.

(56) References Cited

U.S. PATENT DOCUMENTS 10,227,841 B2 3/2019 Fripp et al.
10,287,854 B2 5/2019 Jaaskelainen et al.
(Continued)

OTHER PUBLICATIONS

Ünalmis, et al., "In-Well, Optical, Strain-Based Flow Measurement Technology and Its Applications", Paper presented at the SPE Europec/EAGE Annual Conference, Copenhagen, Denmark, Jun. 2012, 18 pages.
(Continued)

*Primary Examiner* — Kristyn A Hall
(74) *Attorney, Agent, or Firm* — Delizio, Peacock, Lewin & Guerra

(57) ABSTRACT

A partially dissolvable plug is to be deployed in a position in a wellbore formed in a subsurface formation. The partially dissolvable plug comprises a first portion comprising a dissolvable material that is to dissolve over time after exposure to a downhole ambient environment in the wellbore and a second portion comprising a non-dissolvable material that is to create a flow restriction as the flow of fluid passes through the partially dissolvable plug. The first portion is to prevent a flow of fluid from downhole to a surface of the wellbore until at least a portion of the dissolvable material is dissolved. A flow rate is to be determined based on a detected change in a downhole attribute that is to change in response to the flow of fluid passing through the partially dissolvable plug after at least a portion of the partially dissolvable plug is dissolved.

20 Claims, 14 Drawing Sheets

(56) References Cited

U.S. PATENT DOCUMENTS

| | | | |
|---|---|---|---|
| 10,626,718 | B2 | 4/2020 | Jaaskelainen et al. |
| 10,767,439 | B1* | 9/2020 | Rosenholm ............. C08L 29/04 |
| 2018/0230770 | A1 | 8/2018 | Oag et al. |
| 2019/0369276 | A1* | 12/2019 | Barfoot .................. G01H 9/004 |
| 2020/0032602 | A1* | 1/2020 | Jennings ............... E21B 43/116 |
| 2022/0090947 | A1* | 3/2022 | Gamber ................. E21B 47/10 |

OTHER PUBLICATIONS

"CA Application No. 3110368 Office Action", dated Jul. 26, 2022, 4 pages.
U.S. Appl. No. 17/154,904, Non-Final Office Action, dated Oct. 18, 2022, 11 pages.

* cited by examiner

WELLBORE FLOW MONITORING USING A PARTIALLY DISSOLVABLE PLUG

BACKGROUND

The disclosure generally relates to wellbore operations and more specifically to wellbore flow monitoring using a partially dissolvable plug.

In hydrocarbon recovery operations from a wellbore, monitoring where hydrocarbons are being produced within the wellbore can be important in order to maximize hydrocarbon recovery. Downhole fiber optic sensors can be used to provide such monitoring. For example, fiber optic sensing can provide distributed and/or multi-point sensing to provide for monitoring flows in the wellbore.

However, there can be many challenges to subsurface production monitoring. For example, such challenges can include a wide range of production rates, changing pressure profiles, long horizontal wells with low flow contribution/unit length well-bore resulting in laminar flow conditions for many wells, and slowly changing flow rates over time. Additionally, unconventional wells may have initial production rates of 500-1000 barrels per day (bpd) with rapid production declines resulting in low production rates (e.g., 10-100 bpd) or even lower. In hydrocarbon recovery operations having low production rates, the energy, flow disturbances, eddy currents or any other indication of flow can be extremely difficult to measure given the low signal amplitude.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to plug and perforation operations in illustrative examples. Aspects of this disclosure can be also applied to injection operations. In other instances, well-known instruction instances, protocols, structures and techniques have not been shown in detail in order not to obfuscate the description.

In some embodiments, partially dissolvable plugs can be positioned in a wellbore formed in a subsurface formation to enhance flow monitoring in low flow environments. Additionally, these plugs can also avoid or limit intervention after fracturing operations. The partially dissolvable plug can disturb flow conditions in a way that enables flow sensing with higher accuracy. For example, after dissolution of the dissolvable portion of the plug, a shaped flow obstruction can remain in the wellbore to enable more accurate flow sensing (for example, using acoustic and/or pressure sensing). Sensors, such fiber optic cables, may be installed in the wellbore to provide for such sensing.

To illustrate, one example target application can be a plug and perforation completion of a well that is drilled into a subsurface hydrocarbon bearing formation. Plug and perforation completion can include setting a plug between each hydraulic fracture stage. A section above the plug can then perforated and hydraulically fractured. The process can then be repeated up the well until the different stages have been fractured. Conventionally, the plugs can be drilled out using a coiled tubing driven device that basically grinds the plugs to pieces. However, example embodiments (as described herein) include a partially dissolvable plug that can dissolve over time when exposed to the downhole ambient environment (e.g., temperature) and the flow of fluids. A second portion of the plug can remain to create a flow restriction that generates an acoustic and/or pressure variation that can be measured with one or more sensors (as further described below). Accordingly, example embodiments include a partially dissolvable plug having multiple uses. A first use of such a plug is to allow for the flow of fluid through the plug without requiring drilling out of such plugs (as is done in conventional plug and perforation completions). A second use of such a plug is to create flow restriction to allow for more accurate detection of the flow rate (especially when the flow rate is low).

Example System

Figure 1:
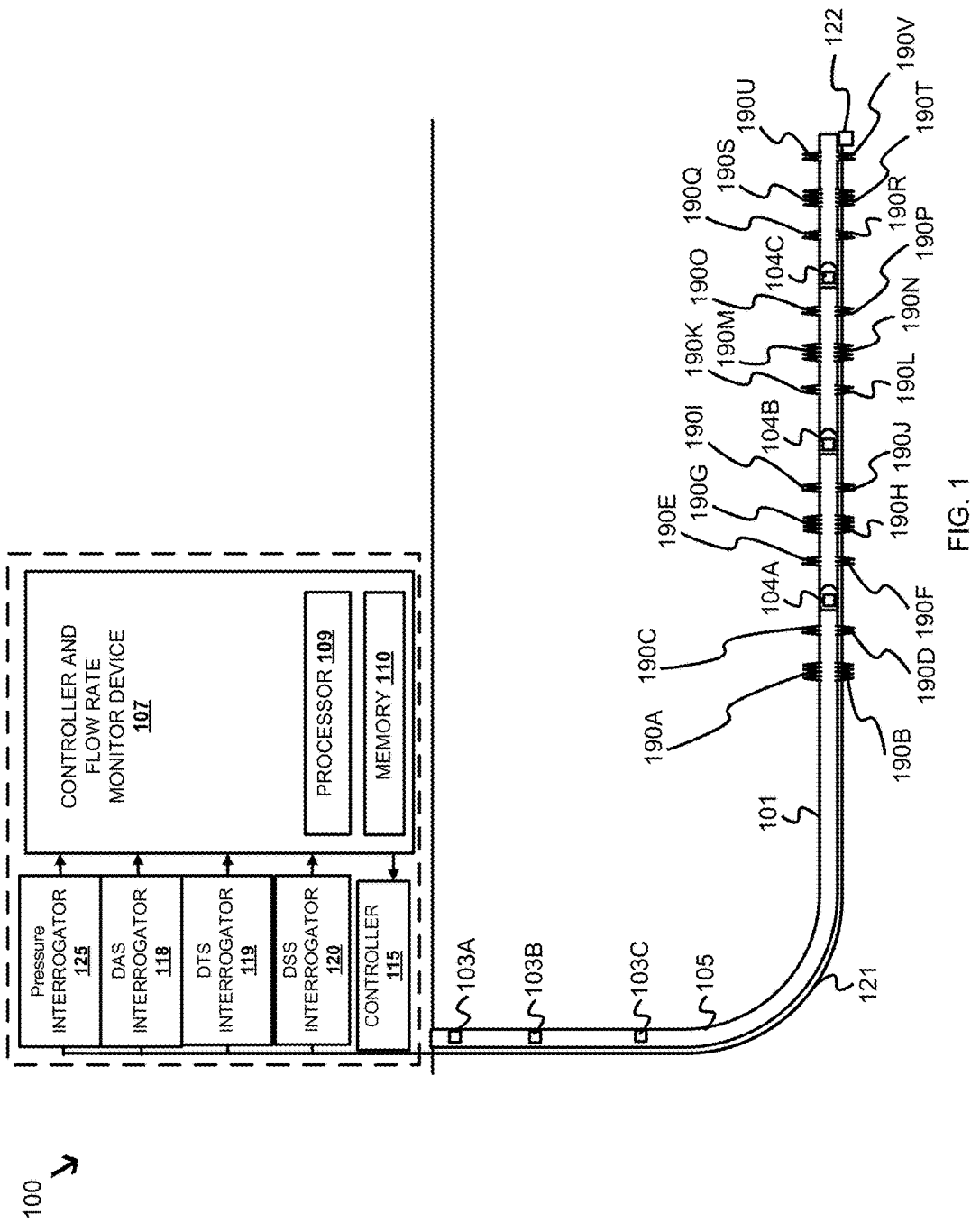
FIG. 1 depicts an example well system with distributed fiber optic sensors and partially dissolvable plugs, according to some embodiments.

FIG. 1 depicts an isometric view of an example well system with distributed fiber optic sensors and partially dissolvable plugs, according to some embodiments. A well system 100 comprises an infrastructure for pumping (not shown) and monitoring fluids within a wellbore 101. The well system 100 contains multiple sensors. Sensors may be at the surface of the wellbore 101, such as a sensor 103A, or sensors may be at various locations downhole, such as sensors 103B-C. The sensors may be pressure sensors, distributed fiber optic sensors, point temperature sensors, point acoustic sensors, or point strain sensors. Distributed fiber optic sensors are capable of measuring distributed acoustic data, distributed temperature data, or distributed strain data. The sensors 103A-C may be cemented to a casing 105.

Partially dissolvable plugs ("plugs") 104A-C may be positioned in the wellbore 101 at different depths. As further described below, each of the plugs 104A-C may include a portion that is dissolvable when exposed to the downhole ambient environment and the flow of fluids. After dissolving, a flow of the fluids can pass through the plugs 104A-C to create flow restriction to allow for more accurate detection of the flow rate (especially when the flow rate is low).

FIG. 1 also illustrates a number of perforations 190A-190V being made in the casing 105 at different depths as part of hydraulic fracturing and relative to positions of the plugs 104A-104C. In this example, the perforations 190A-190B have been made at a first depth. The perforations 190C-190D have been made at a depth below the first depth and above a position of the plug 104A. The perforations 190E-190F have been made at a depth that is below the position of the plug 104A. The perforations 190G-190H have been made at a depth below the position of the perforations 190E-190F. The perforations 190I-190J have been made at a depth below the position of the perforations 190G-190H and above a position of the plug 104B.

The perforations 190K-190L have been made at a depth that is below the position of the plug 104B. The perforations 190M-190N have been made at a depth below the position of the perforations 190K-190L. The perforations 190O-190P have been made at a depth below the position of the perforations 190M-190N and above a position of the plug 104C. The perforations 190Q-190R have been made at a depth that is below the position of the plug 104C. The perforations 190S-190T have been made at a depth below the position of the perforations 190Q-190R. The perforations 190U-190V have been made at a depth below the position of the perforations 190S-190T.

Additional sensors may be located in the plugs 104A-C. Fiber optic cables, such as a fiber optic cable 121, may also be used to obtain measurements in addition to the sensors. The fiber optic cable 121 may be cemented in place in the annular space between the casing 105 of the wellbore 101 and the formation. The fiber optic cable 121 may be clamped to the outside of the casing 105 during deployment and protected by centralizers and cross coupling clamps. The fiber optic cable 121 may house one or more optical fibers, and the optical fibers may be single mode fibers, multi-mode fibers, or a combination of single mode and multi-mode optical fibers. Additional point sensors, such as a pressure point sensor 122, may be included at the end of the fiber optic cable 121 to obtain measurements at the end of the wellbore 101. The pressure point sensor 122 may be an optical or an electrical sensor. The pressure point sensor 122 may be based on quartz type sensors, strain gauge-based sensors, or other commonly used sensing technologies. While depicted as attached to the fiber optic cable 121 in FIG. 1, the pressure point sensor 122 may alternatively be housed in dedicated gauge mandrels or attached outside the casing in various configurations for down-hole deployment or deployed conventionally at a surface well head or flow line. Various hybrid approaches where single point, quasi-distributed, or distributed fiber optic sensors are mixed with the pressure point sensor 122 are also anticipated. The fiber optic cable 121 may then include optical fiber and electrical conductors.

The fiber optic cable 121 may be used for distributed sensing where acoustic, strain, and temperature data are collected. The data may be collected at various positions distributed along the fiber optic cable 121. For example, data may be collected every 1-3 ft along the full length of the fiber optic cable 121. The fiber optic cable 121 may be included with coiled tubing, wireline, loose fiber using coiled tubing, or gravity deployed fiber coils that unwind the fiber as the coils are moved in the wellbore 101 The fiber optic cable 121 may also be deployed with pumped down coils and/or self-propelled containers. Additional deployment options for the fiber optic cable 121 can include coil tubing and wireline deployed coils where the fiber optic cable 121 is anchored at the toe of the well. In such embodiments the fiber optic cable 121 can be deployed when the wireline or coiled tubing is removed from the well. The distribution of sensors shown in FIG. 1 is for example purposes only. Any combination of sensor deployment described may be used. For example, the well system 100 may include fiber optic cable deployed sensors or sensors cemented into the casing. Different types of sensors deployments may also be combined in a single well, such as including both sensors cemented to the casing and sensors in plugs in a single well system.

Sensor interrogation systems, such as DAS interrogator 118, DTS interrogator 119, DSS interrogator 120, and/or pressure interrogator 125, can communicate measurements from the sensors to a controller and flow rate monitor device ("device") 107. The interrogators decode signals received from the downhole fiber optic cables and sensors to provide useful information to the device 107 at the surface. The pressure point sensor 122 may communicate pressure data to the device 107 directly. The pressure point sensor 122 may also communicate data to the device 107 through the pressure interrogator 125, which may interrogate electrical or optical sensors. The device 107 includes a processor 109 and a memory 110. The device 107 can transmit a signal to a controller 115 that controls or advises the deploying of the partially dissolvable plugs and perforation operations in the wellbore 101. The controller 115 can include hardware and software to operate equipment (not shown) that are part of the deploying and perforating in the wellbore 101.

The interrogators 118-120 and 125 may operate using various sensing principles including but not limited to amplitude-based sensing systems like DTS, DAS, and DSS. For example, the DTS interrogator 119 may be based on Raman and/or Brillouin scattering. The DAS interrogator 118 may be a phase sensing-based system based on interferometric sensing using homodyne or heterodyne techniques where the system may sense phase or intensity changes due to constructive or destructive interference. The DAS interrogator 118 may also be based on Rayleigh scattering and in particular coherent Rayleigh scattering. The DSS interrogator 120 may be a strain sensing system using dynamic strain measurements based on interferometric sensors or static strain sensing measurements using Brillouin scattering. The DSS interrogator 120 may also utilize quasi-distributed sensors based on Fiber Bragg Gratings (FBGs) where a wavelength shift is detected or multiple FBGs are used to form Fabry-Perot type interferometric sensors for phase or intensity based sensing, or single point fiber optic sensors based on Fabry-Perot or FBG or intensity-based sensors. DAS systems based on Rayleigh scattering may also be used to detect dynamic strain events. Temperature effects may in some cases be subtracted from both static and/or dynamic strain events, and temperature profiles may be measured using Raman based systems and/or Brillouin based systems capable of differentiating between strain and temperature, and/or FBG based temperature sensors, and/or any other optical and/or electronic temperature sensors, and/or estimated thermal events.

Temperature measurements from a DTS system obtained by the DTS interrogator 119 may be used to determine locations for fluid inflow in the wellbore 101 as the fluids from the surface are likely to be cooler than formation temperatures. DTS warm-back analyses may be used to determine fluid volume placement. This is often done for water injection wells and the same technique can be used for fracturing fluid placement. In multi-well systems, temperature measurements in observation wells can be used to determine fluid communication between a treatment well and an observation well, or to determine formation fluid movement.

DAS data can be used to determine fluid flow rate in real-time as acoustic noise is generated when fluid flows through the casing. Many DAS systems measure changes in optical fiber properties between two points in an optical fiber at any given point, and these two measurement points move along the optical sensing fiber as the light travels along the optical fiber. Changes in optical properties may be induced by strain, vibration, acoustic signals and/or temperature as a result of the fluid flow. Phase and intensity based interferometric sensing systems are sensitive to temperature and mechanical, as well as acoustically induced, vibrations. DAS data can be converted from time series data to frequency domain data using Fast Fourier Transforms (FFT) and other transforms, like wavelet transforms, may also be used to generate different representations of the data. Various frequency ranges can be used for different purposes and where low frequency signal changes may be attributed to formation strain changes or fluid movement and other frequency ranges may be indicative of fluid or gas movement. Various filtering techniques may be applied to generate indicators of events related to measure the flow of fluid.

DAS data along the wellbore 101 may be used as an indication of fluid flow in the wellbore. Vibrations and/or acoustic profiles may be recorded and stacked over time where a simple approach could be to correlate total energy or recorded signal strength with known flow rates. For example, surface flow rates and fluid properties may be measured. Then, the pressure/volume/temperature may be corrected for the changes between the surface and the heel of the well to arrive at a known flowrate that can then be correlated with the measurement. This correlation can be used to allocate flow in proportion to energy across a horizontal wellbore from the toe, where flow is 0%, to the heel, where flow is 100%. More sophisticated processing may also be applied where energy and/or amplitude in select frequency bands may be used. Other approaches include measuring energy and/or amplitude in multiple frequency bands where changes in select frequency bands may be associated with oil, water and/or gas thus enabling multi-phase production profiling along the wellbore.

Continuous measurements enable information gathering during dynamic and static conditions where different information may be gathered. Dynamic conditions where flow rates may be altered in a pre-determined fashion, such as a step-up and/or step-down in production rates, may change flow conditions across inflow points/perforations such that fluid flow and associated fluid flow related effects/events can be detected and identified. Events include Joule-Thompson cooling and/or heating, fluid inflow of liquids with different temperature than the wellbore, tracking thermal slugs and/or temperature changes along the wellbore, coherent detection where cross-correlation is used to track thermal, and/or vibrational and/or fluid disturbance events. Some of the data, like inflow locations, can then be used during the static and/or dynamic measurement conditions by constraining models used for flow allocation, fluid flow profiling, and/or multi-phase identification and determination.

Fiber Bragg Grating based systems may also be used for a number of different measurements. FBG's are partial reflectors that can be used as temperature and strain sensors or can be used to make various interferometric sensors with very high sensitivity. FBG's can be used to make point sensors or quasi-distributed sensors where these FBG based sensors can be used independently or with other types of fiber optic-based sensors. FBG's can be manufactured into an optical fiber at a specific wavelength, and other system like DAS, DSS or DTS systems may operate at different wavelengths in the same fiber and measure different parameters simultaneously as the FBG based systems using Wavelength Division Multiplexing (WDM).

The sensors can be placed in the wellbore 101 to measure production flow profiles. Example sensors for flowing sensing are described in more detail below in reference to FIGS. 8-11.

Partially Dissolvable Plug Examples

Figure 2:
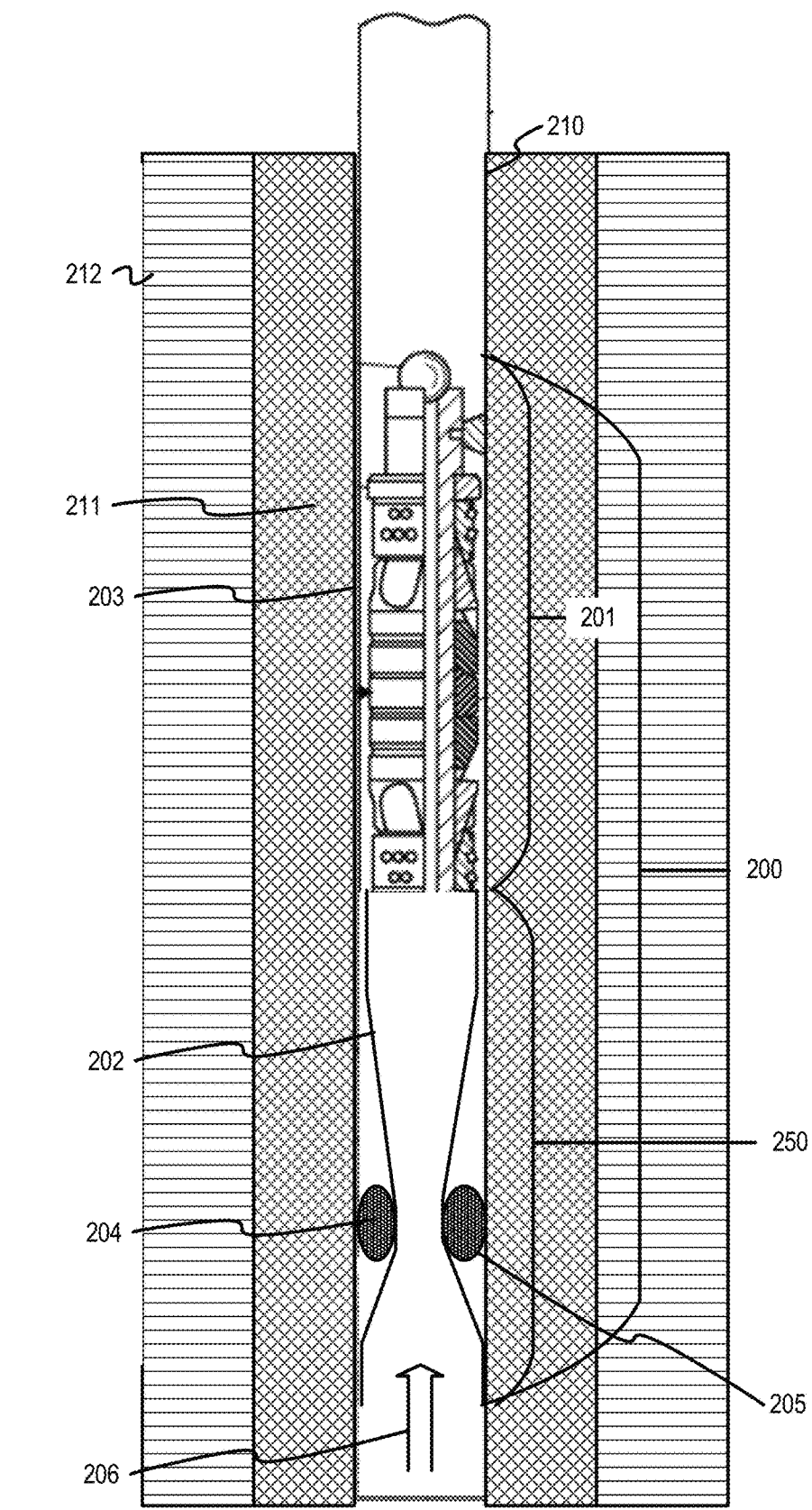
FIG. 2 depicts an example of a partially dissolvable plug with a shaped flow obstruction, according to some embodiments.

FIG. 2 depicts an example of a partially dissolvable plug with a shaped flow obstruction, according to some embodiments. A plug 200 may be deployed downhole for plug and perforation ("plug and perf") operations. The plug 200 may be in a wellbore 210 surrounded by cement 211 and a subsurface formation 212. With reference to FIG. 1, the plug may be similar to plugs 104A-C. Plug and perf deployments can include setting a plug between each hydraulic fracture stage and a section above the plug can then be perforated and hydraulically fractured. The process is then repeated up the well until the well and all stages have been fractured.

Once fracturing is complete, fluid needs to flow between the different sections created by the plugs. Traditionally, the plugs are drilled out using a coiled tubing driven device that grinds the plugs to pieces in order to provide for this flow of fluid. However, this can be expensive and time consuming, and pieces of the plug can become lodged in the wellbore and can slow fluid flow through the wellbore. In contrast, example embodiments instead use partially dissolvable plugs—thereby eliminating the need to drill out the plugs to allow for the flow of fluid between the different sections of the wellbore 210. The plug 200 is comprised partly of a material that dissolves over time when exposed to the downhole ambient environment and the flow of fluids. The dissolvable material is beneficial as it creates a high pressure in a hydraulically fractured well while also minimizing well intervention by keeping wells flowing and preventing blockages.

The plug 200 includes two portions—a dissolvable portion 201 and a non-dissolvable portion 250. In FIG. 2 the dissolvable portion 201 is uphole of the non-dissolvable portion 250. The dissolvable portion 201 may be made of a dissolvable metal, degradable elastomer, or other known dissolvable materials. Suitable materials for the dissolvable portion 201 include, but are not limited to, gold, gold-platinum alloys, silver, nickel, nickel-copper alloys, nickel-chromium alloys, copper, copper alloys (e.g., brass, bronze, etc.), chromium, tin, aluminum, aluminum alloys, iron, zinc, magnesium, magnesium alloys, beryllium, any alloy of the aforementioned materials, and any combination thereof. The dissolvable portion 201 is designed to withstand the high pressures and temperatures that are experienced during a plug and perf operation, and then gradually break down, or dissolve, into tiny particles that do not need to be recovered. The material of the dissolvable portion 201 is designed to dissolve in response to contact with a fracturing fluid, a completion brine, downhole fluids, hydrocarbons, water-based fluids, or other fluids that may be present or injected downhole. The non-dissolvable portion 250 includes a flow obstruction 202.

The materials used for the dissolvable portion 201 are selected based on known wellbore conditions and desired degradation time. In particular, time for the dissolvable material to dissolve can vary depending on the material, the downhole ambient environment and the fluids to which the material is exposed. Time for the dissolvable material to dissolve in response to being positioned downhole can be minutes, days, weeks, months, etc. The dissolved particles do not impede the flow of fluids in the well. This saves considerable time and cost as operators are not required to run a coiled tubing or wire line down the hole to drill out and remove plugs, as is necessary with traditional plugs. After the dissolvable portion 201 is dissolved, the flow obstruction 202 creates a flow restriction that generates an acoustic and/or pressure variation that can be measured with one or more sensing techniques mentioned above.

The position of the flow obstruction 202 can be maintained using isolation devices and/or anchoring devices, such as swell packers and or swellable materials (hereinafter "packers") 204 and 205. In the absence of the dissolvable portion 201, fluid is able to flow through the flow obstruction 202 in a direction indicated by an arrow 206.

The plug 200 functions under two main mechanisms depending on the amount of time spent downhole. When first deployed and the dissolvable portion 201 is present, the plug 200 can operate as a plug to isolate a portion of the wellbore. After a time, when the dissolvable portion 201 is absent, the plug 200 can serve as a sensing plug as fluid is allowed to flow through the flow obstruction 202. In some embodiments, the number of plugs that are partially dissolvable can be a subset of the plugs positioned downhole. In other embodiments, all of the plugs positioned downhole are partially dissolvable.

The location of perforation guns and/or perforation plugs may be tracked with a DAS system, such as the DAS interrogator 118 of FIG. 1, when a fiber optic cable 203 is deployed alongside the plug 200. The guns and/or perforation plugs may have devices that actively emit acoustic signals for accurate position location during the plug and perforation operations where the plug 200 can be positioned such that sensors mounted outside the casing that are ported to the inside of the casing can be used for flow measurements. In some embodiments, a fully distributed fiber can be positioned downhole and may be used regardless of the plug 200 and/or flow restriction location. The flow restriction created by the flow obstruction 202 allows for a DAS based noise flow measurement, among other measurements. While not pictured in FIG. 2, fins or other obstructions may be included in the plug 200 to create turbulence and/or aid in mixing phases of the fluids.

Figure 3:
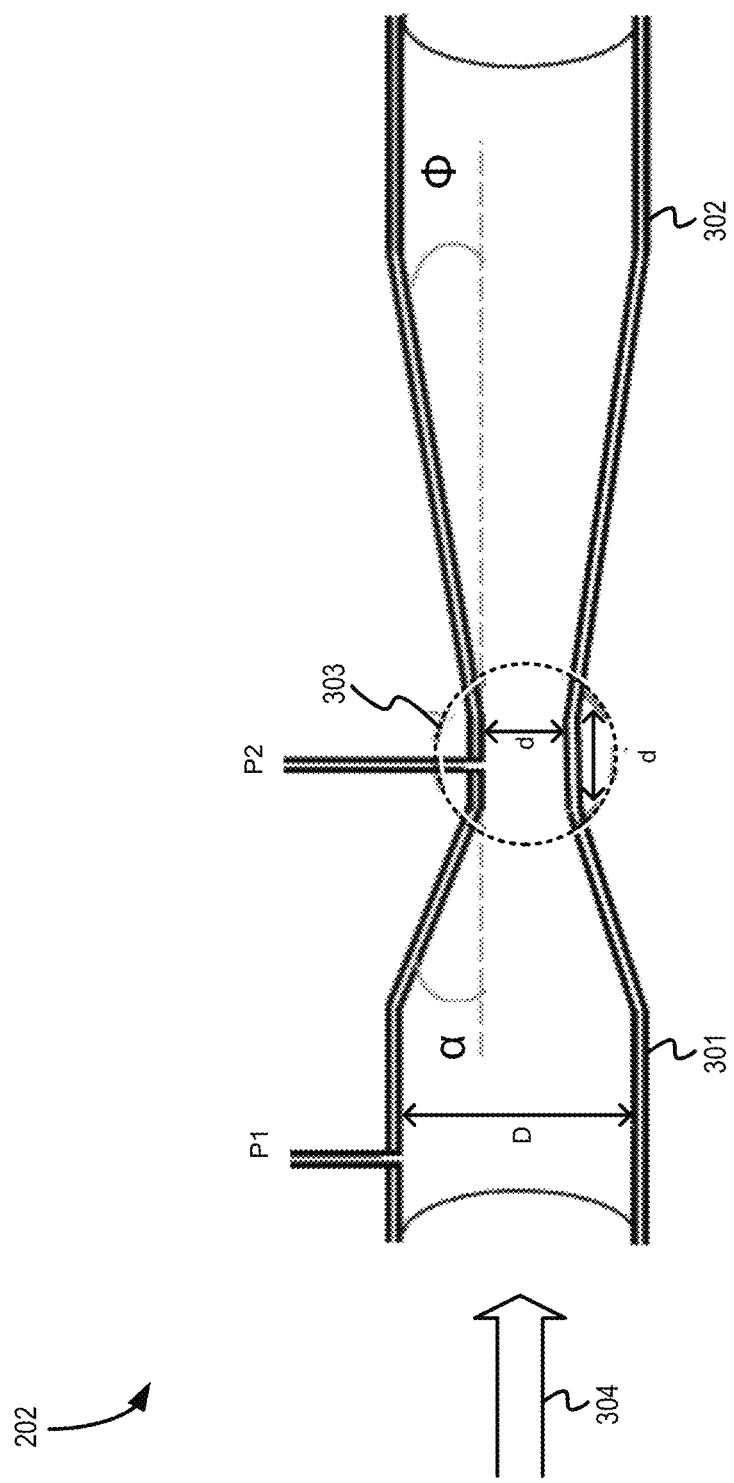
FIG. 3 depicts an example flow obstruction of a non-dissolvable portion of a partially dissolvable plug, according to some embodiments.

FIG. 3 depicts an example flow obstruction of a non-dissolvable portion of a partially dissolvable plug, according to some embodiments. FIG. 3 provides a close-up view of the flow obstruction 202 of FIG. 2. The flow obstruction 202 may be referred to as a "Venturi tube" as the shape of the tube produces a Venturi effect by creating a constriction that varies the flow characteristics of a fluid travelling through the tube in a direction indicated by an arrow 304. The flow obstruction 202 of a tube with a short, narrow center, or throat 303, and widened, tapered ends 301 and 302. The throat 303 may have a diameter, d, while the tapered ends 301 and 302 may have a diameter D, where D is greater than d. While exhibiting the same diameter, D, on the opening, the tapered portion of the tapered ends 301 and 302 may have different lengths. This may result in different angles extending into and out of the throat 303. For example, the angle extending into the throat 303 from tapered end 301, α, may be 10.5° while the angle extending out of the throat to tapered end 302, Φ, may be 5°-15°. In accordance with the principle of conservation of mechanical energy, the energy per unit volume at tapered end 301 must be equal to the energy per unit volume at the throat 303. The smaller diameter of the flow obstruction 202 at the throat creates a smaller area than the initial area of the flow obstruction 202 at the tapered end 301. Because the area is smaller at the throat 303, the velocity of the fluid is faster at the throat 303 than at the tapered end 301. As the fluid velocity increase, the pressure decreases, and P2 is less than P1. The differential pressure created by the flow obstruction 202 allows for the measurements of fluid flow rate. The flow obstruction 202 may also allow for mixing of fluids.

Figure 4:
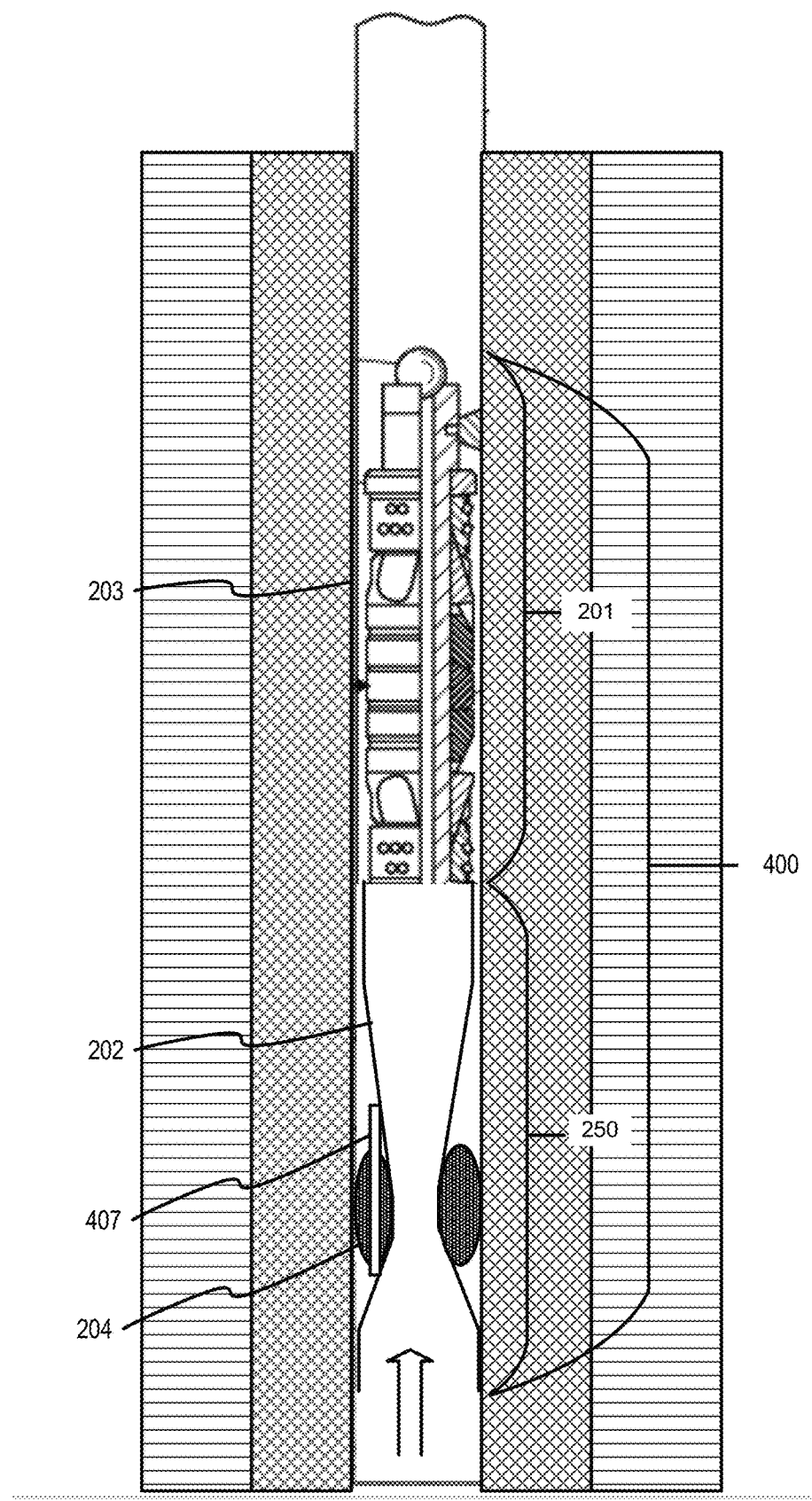
FIG. 4 depicts an example of a partially dissolvable plug with a shaped flow obstruction and a flow monitoring sensor, according to some embodiments.

FIG. 4 depicts a second example of a partially dissolvable plug (having a shaped flow obstruction and a flow monitoring sensor), according to some embodiments. A partially dissolvable plug ("plug") 400 of FIG. 4 may be substantially similar to the partially dissolvable plug of FIG. 2. Like numerals are used to represent comparable elements and may not be described in detail again.

Figure 8:
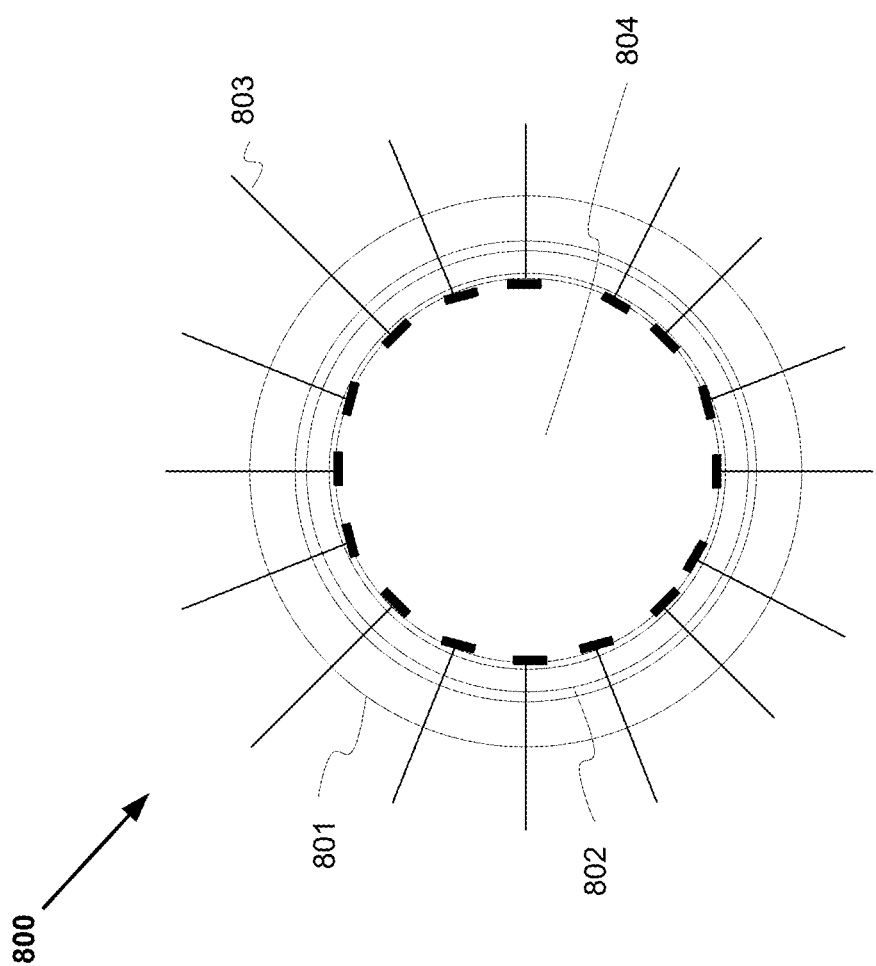
FIG. 8 depicts an example EAT sensor for monitoring flow using a shaped flow obstruction from a partially dissolvable plug, according to some embodiments.
Figure 9:
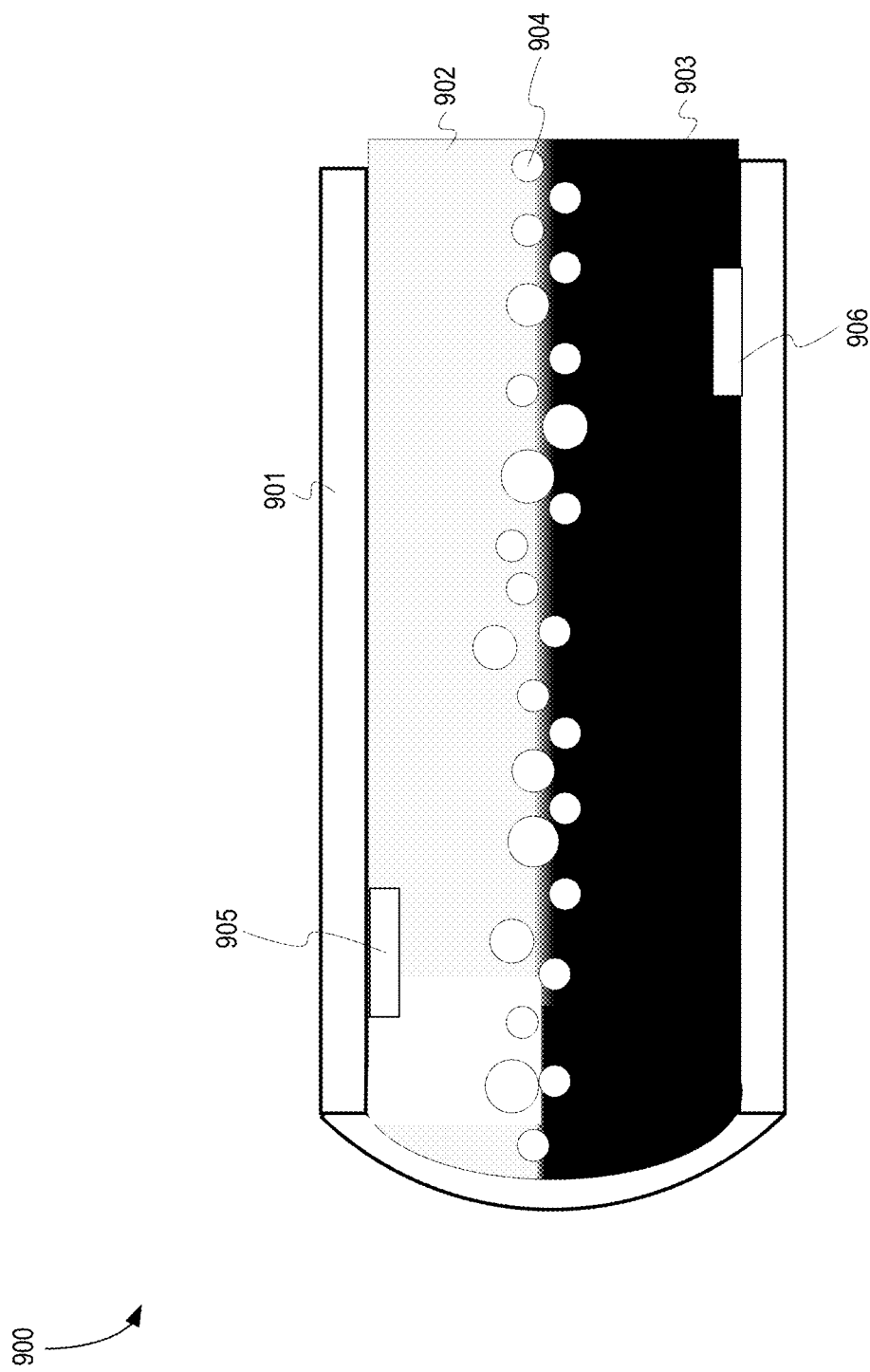
FIG. 9 depicts an example system for monitoring a stratified flow structure, according to some embodiments.

Similar to the plug 200 of FIG. 2, the plug 400 includes the dissolvable portion 201 and the non-dissolvable portion 250. Unlike, the plug 200 of FIG. 2, the plug 400 includes a flow monitoring sensing module ("sensing module") 407 positioned near the flow obstruction 202 within the non-dissolvable portion 250. The sensing module 407 may be deployed with the plug 400 to detect and monitor fluid flow. The sensing module 407 may be an EAT sensing module that can include sensor(s), electronics, batteries, and/or an acoustic transducer. Example sensors that may be included in the sensing module 407 include one or more EAT pressure differential sensors, a square foot ("SF") pressure array, an electrical sensor, etc. For example, two pressure sensors may be used to measure the pressure at two locations within the non-dissolvable portion 250. With reference to FIG. 3, pressure sensors may be used to measure the pressures P1 at tapered end 301 and P2 at the throat 303. The sensing module 407 may also have means for energy harvesting. In horizontal wells, the sensing module 407 may include a resistance/capacitance sensor for obtaining measurements in wells where the gas, oil, and or water may layer in laminar flow situations. An example of such a sensor is depicted in FIG. 8, which is described in more detail below. An example of such a laminar flow in a horizontal well is depicted in FIG. 9, which is described in more detail below.

The packer 204 can maintain the position of the sensing module 407. In some embodiments, the sensing module 407 can acoustically communicate with the fiber optic cable 203 to transmit measurements to the surface. The sensing module 407 may also be in contact with the fiber optic cable 203. Thus, the sensing module 407 and the fiber optic cable 203 can allow for advanced flow measurements.

The sensing module 407 may be activated by a mechanism controlled by a dissolvable metal. The sensing module 407 may include a dissolvable material (e.g., a dissolvable metal) that can create or remove a conductive bridge. This dissolvable material may be the same or similar to the dissolvable material of the dissolvable portion 201. In other embodiments, this dissolvable material can be different than the dissolvable material of the dissolvable portion 201. The sensing module 407 may be in a sleep mode with an automatic periodic check to see if the conductive bridge is intact or not. Once the bridge has been dissolved, then the sensing module 407 can start to do periodic measurements and transmissions on a pre-determined schedule. Alternatively, the dissolvable portion 201 may release a chemical substance that activates the sensing module 407. Alternatively, or in addition, the dissolution of the dissolvable portion 201 may cause a pressure change that can activate the sensing module 407. Alternatively, or in addition, a change in the swellable material of the packer 204 may also activate the sensing module 407.

Figure 5:
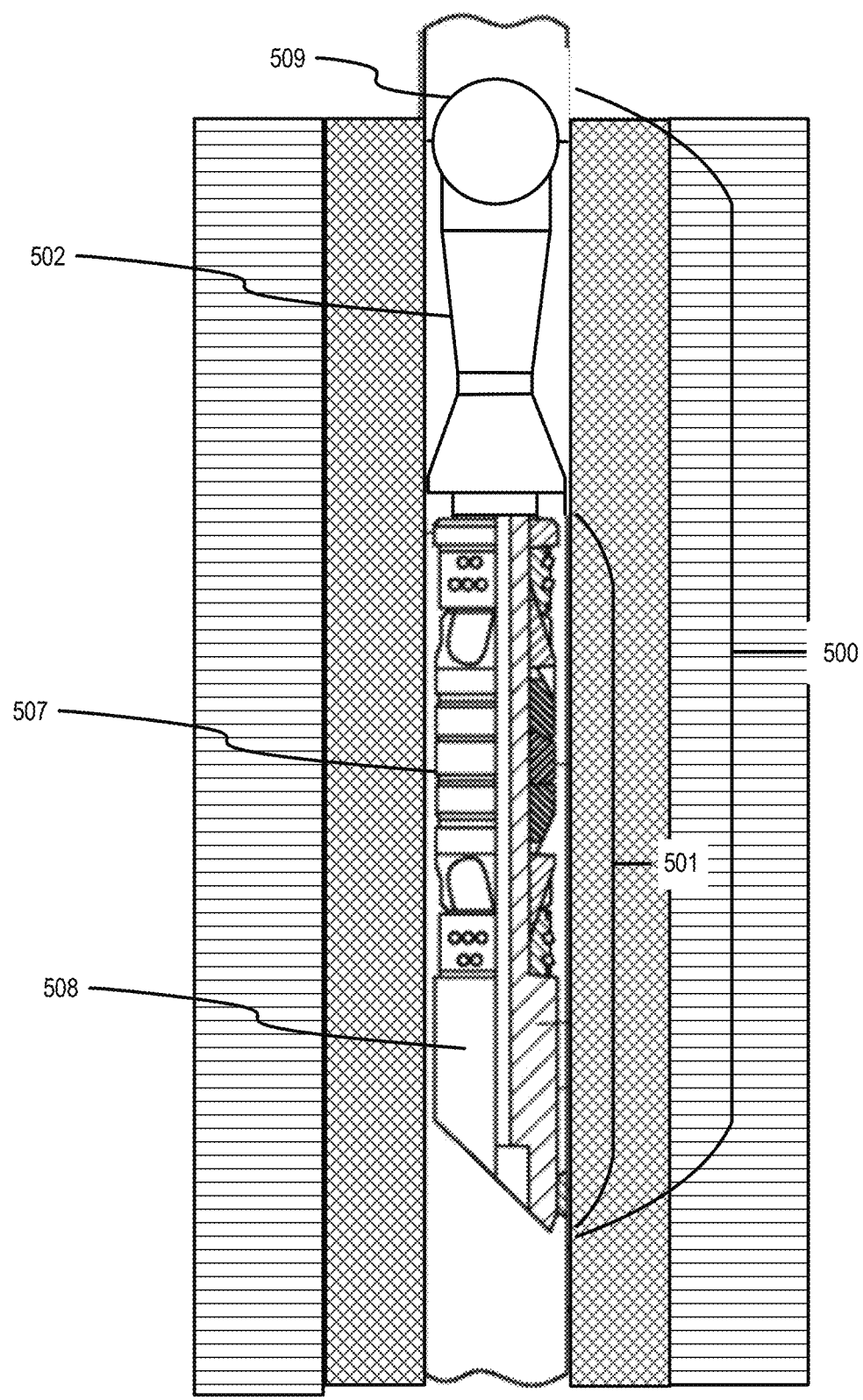
FIG. 5 depicts an example of a partially dissolvable plug with an uphole shaped flow obstruction, according to some embodiments.

FIG. 5 depicts a third example of a partially dissolvable plug (having an uphole shaped flow obstruction), according to some embodiments. In contrast to the plugs 200 and 400 of FIGS. 2 and 4, respectively, a partially dissolvable plug ("plug") 500 of FIG. 5 has positioned a non-dissolvable portion between two dissolvable portions.

The plug 500 may have many similar elements to the plug 200 of FIG. 2 and the plug 400 of FIG. 4. The plug 500 includes a non-dissolvable portion 502 and two dissolvable portions: a dissolvable plug 501 and a dissolvable ball 509. In this example, the non-dissolvable portion 502 is positioned between the two dissolvable portions. The dissolvable plug 501 is downhole of the non-dissolvable portion 502 while the dissolvable ball 509 is uphole of the non-dissolvable portion 502. The non-dissolvable portion 550 may be a flow obstruction substantially similar to the flow obstruction 202 as depicted in FIGS. 2 and 3. By placing the non-dissolvable portion 502 uphole to the dissolvable plug 501, existing plugs may be modified to include a flow restriction, saving time and costs associated with constructing a completely new plug. With the non-dissolvable portion 502 uphole, the dissolvable plug 501 may include traditional plug elements such as a mandrel 508 and sealing elements 507. The mandrel 508 and sealing elements 507 may be fully constructed or coated in a dissolvable metal or degradable material, similar to those described in FIG. 2. Including the dissolvable tapered mandrel 508 may assist the installation process by providing an easily maneuverable end. On the opposite end of the non-dissolvable portion 502, the dissolvable ball 509 may be composed of the same dissolvable material as the dissolvable plug 501, or it may be a different dissolvable material. Sandwiching the non-dissolvable portion 502 between the two dissolvable portions allows for a complete seal of the plug 500 during plug and perforation operations, prior to dissolution of the two dissolvable portions.

Figure 6A:
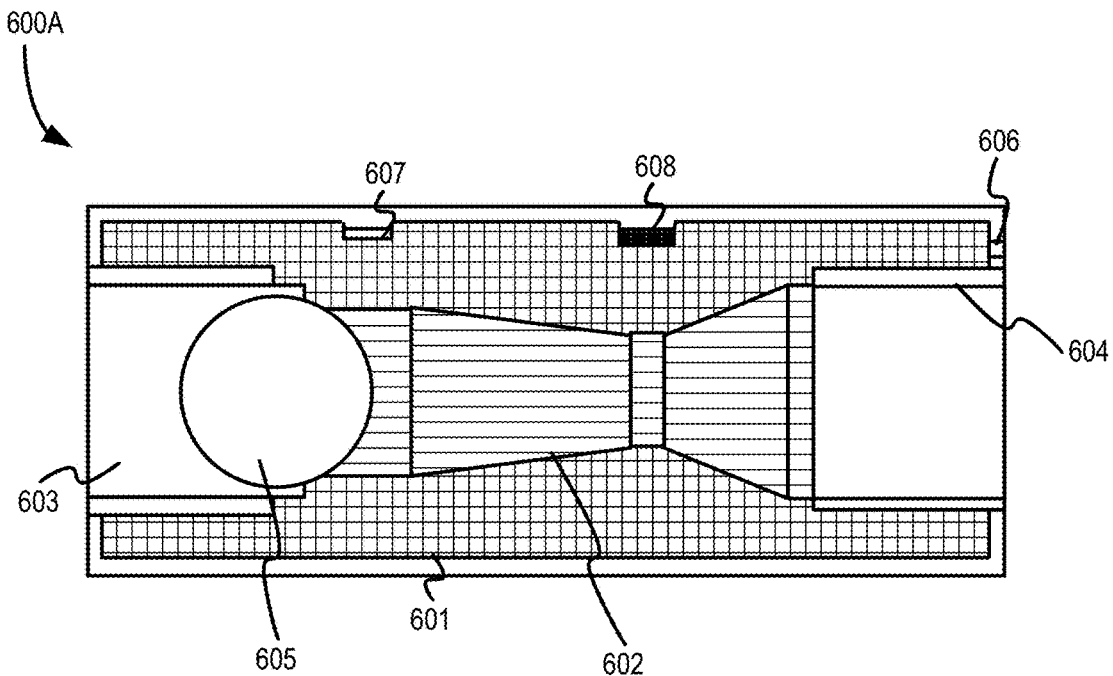
FIG. 6A depicts a cross-sectional view of a portion of a partially dissolvable plug with a flow meter system, according to some embodiments.

FIG. 6A depicts a cross-sectional view of a portion of a partially dissolvable plug with a flow meter system, according to some embodiments. A flow meter system 600A includes a mounting casing 601 surrounding a portion of a partially dissolvable plug including a flow meter restriction 602. The partially dissolvable plug may be similar to the plug 500 of FIG. 5. The mounting casing 601 can include fiber optic mounting ports 607 and 608. The fiber optic mounting ports 607 and 608 may be used to secure a fiber optic cable 606 in a cutout along the mounting casing 601. While only one fiber optic cable and two mounting ports are depicted in FIG. 6A, any number of fiber optic cables and mounting ports may be used. The fiber optic mounting ports 607 and 608 may also include additional sensors for obtaining measurements. The flow meter restriction 602 includes an inlet choke flow port 603 and an outlet choke flow port 604. The inlet choke flow port 603 includes a dissolvable ball 605. The dissolvable ball 605 may be of a similar composition to the dissolvable portion of the plugs of FIGS. 2, 4 and 5.

Figure 6B:
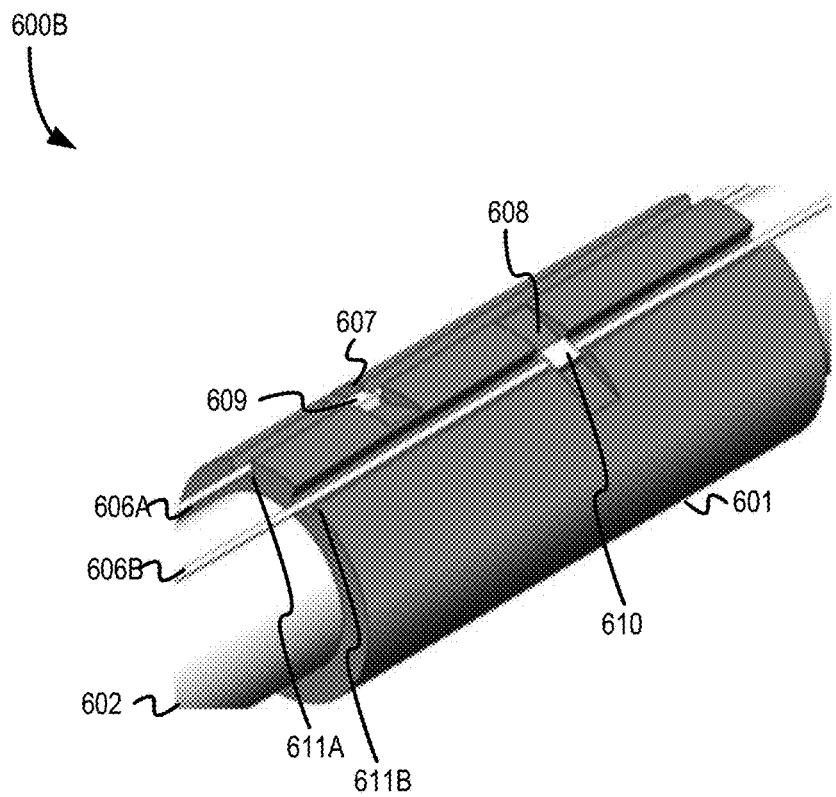
FIG. 6B depicts a perspective view of a mounting casing with fiber optic mounting ports, according to some embodiments.

FIG. 6B depicts a perspective view of a mounting casing with fiber optic mounting ports, according to some embodiments. The embodiment of FIG. 6B may be substantially similar to the flow meter system 600A of FIG. 6A. Elements not depicted in FIG. 6B that are included in FIG. 6A are understood to be housed within the casing. However, FIG. 6A and 6B are not limited to only what is depicted. Additional elements may be included. A system 600B includes a mounting casing 601 and a flow meter restriction 602. Fiber optic cables 606A and 606B are positioned in cutouts 611A and 611B, respectively. The mounting casing 601 also includes the fiber optic mounting ports 607 and 608. The fiber optic mounting ports 607 and 608 can help maintain the alignment of the fiber optic cables 606A and 606B. The fiber optic mounting ports 607 and 608 can also provide a location for additional sensors, such as sensors 609 and 610.

The embodiments depicted in FIGS. 6A and 6B may be used for production and injection applications. Systems 600A and 600B can incorporate fixed flow restrictions included in the completion where sensor configurations may include hardwired sensors tied to fixed flow restrictions. The flow restrictions can be included as part of wireline and/or coiled tubing deployed solutions and can be matched with sensors permanently cemented outside of a casing. The flow restriction and/or deployment system can have active noise sources that can allow position determination along the wellbore using DAS systems that can track the noise source.

Figure 7:
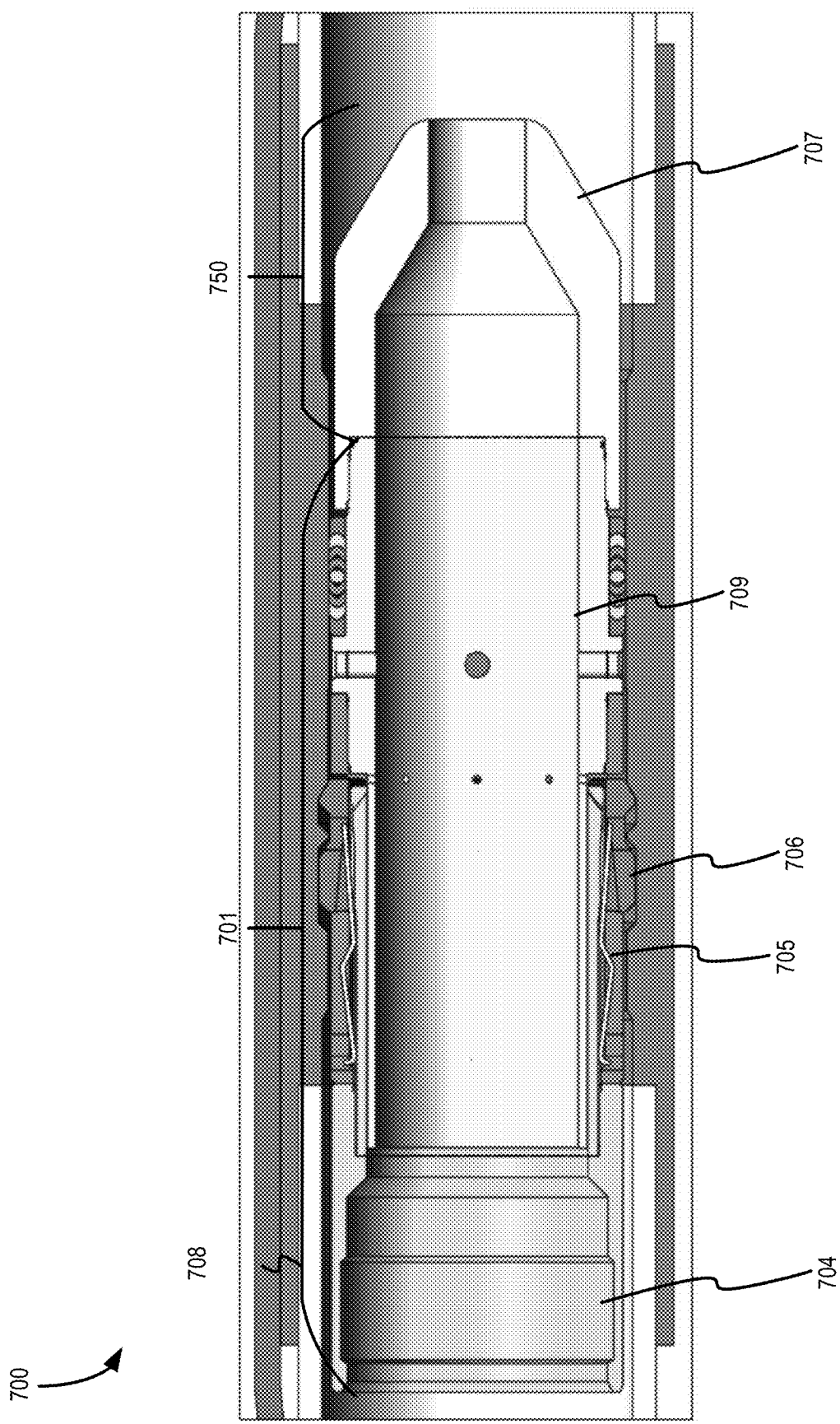
FIG. 7 depicts a partially dissolvable lock mandrel with a bull nose flow restrictor, according to some embodiments.

FIG. 7 depicts a retrievable lock mandrel with a bull nose flow restrictor, according to some embodiments. A lock mandrel 700 may be deployed in a wellbore, such as the wellbore 101 of FIG. 1. The lock mandrel 700 can be run down the wellbore on a slickline to be joined within a tubing string 708 to provide a setting point for flow control devices downhole. The lock mandrel 700 can provide a setting point for flow control equipment such as valves, chokes, and plugs. The lock mandrel 700 may be a slip lock mandrel, a collar lock mandrel, etc. The lock mandrel 700 can engage with the tubing string 708 using packing and/or sealing elements 705 and 706. The lock mandrel 700 includes a mandrel 709 and a connection 704 which can allow for seating of the lock mandrel 700 with the tubing string 708. A bull nose flow restrictor 707 attached to the opposite end of the mandrel 709 from the connection 704 restricts the flow of fluids through the wellbore. Other shapes and sizes of flow restrictions other than bull nose flow restrictions may be included with various deployment options, and these flow restrictions may be deployed in wells using retrievable or temporary deployment options like e.g., coiled tubing, wireline, slick line, pumped down modules, modules with unique latching mechanisms for different positions along the wellbore, deployment systems where multiple modules may be deployed in a single operation, self-propelled modules etc. The fiber optic cables (not shown) may be used for measurement readings. Fiber optic cables may be permanently attached to the casing, temporarily deployed in a well where a coiled tubing/wireline/slickline may contain optical fiber or deployed by temporary deployment means where fibers may be launched as the deployment vehicle is moving down the well (gravity-based deployment modules, pump down modules, self-propelled modules) or when the deployment vehicle is pulled out of the well (coiled tubing, wireline, slickline). A coil of optical fiber or a coil of a cable may be used where the optical fiber or optical fiber cable is launched/released into the well as the deployment vehicle moves up or down the wellbore.

Alternatively, or in addition to the retrievable lock mandrel, portions of the lock mandrel may be dissolvable. Similar to the plugs of FIGS. 2, 4, and 5, the lock mandrel 700 may include a dissolvable portion 701 and a non-dissolvable portion 750. The dissolvable portion 701 may include the mandrel 709 and the connection 704. The dissolvable portion 701 can be made of a dissolvable metal, degradable elastomer, or other known dissolvable materials, as described in FIG. 2. The non-dissolvable portion 750 includes the bull nose flow restrictor 707. After dissolution of the dissolvable portion 701, the bull nose flow restrictor 707 may remain in the wellbore to create a flow obstruction similar to that of the flow obstruction 202 of FIGS. 2, 4, and 5. The bull nose flow restrictor 707 may be held in place by e.g., swellable materials once the dissolvable portion 701 has been dissolved. The bull nose flow restrictor 707 may be open on both ends creating an effect similar to the throat of the venturi flow tube as fluids travel through the smaller opening of the bull nose flow restrictor 707. The bull nose flow restrictor 707 could also be removed or retrieved from the wellbore using the retrievable means.

Alternatively, the mandrel 709 and the connection 704 may be constructed of a non-dissolvable material. In this instance, a dissolvable ball may be added to the lock mandrel 700 to seal the lock mandrel during plug and perforation operations. The dissolvable ball may be included at the opposite end of the lock mandrel 700 from the bull nose flow restrictor 707. The dissolvable ball may be positioned inside the connection 704 or may be positioned on top of the connection 704 to cover the opening. The dissolvable ball may also be positioned inside the mandrel 709.

FIGS. 1-2, 4-5, and 7 depict plugs mounted within a wellbore using contact pressure, provided either from packing and/or sealing elements or direct contact with the wellbore. However, other securing mechanisms may be used to maintain the position of the plugs within the wellbore. Examples of such options can include outside casing mountings that are ported into the casing to accurately position flow restrictions inside the casing.

In some embodiments, flow restrictions can be retrieved and/or replaced as flow rates change. While the embodiments of FIGS. 1-2, 4-5, and 7 show features protruding and restricting the inner diameter of the casing string, embodiments where the features are located deeper in the wall of the collar joints and/or pup joints may also be designed for the purpose of receiving the flow restrictions. Flow restrictions may include EAT based pressure and/or resistance and/or capacitance probes with optional energy harvesting features.

While FIGS. 1-2, 4-5, and 7 depict partially dissolvable plugs, additional choke points may be generated by drilling out portions of the plug or drill out portions of a non-dissolvable plug. This may be done to enhance DAS monitoring. Plugs may be drilled out after the fracturing operation, and the well may be cleaned. In some embodiments, only a part of the plug may be drilled in order to generate periodic flow restrictions where the flow would generate a larger acoustic signature that would be correlated with flow.

In some embodiments, resistance and/or capacitance probes may be provided in multiple locations for cross correlation measurements. Multiphase flow determination can be used when the electronics, such as sensors, electrodes, batteries, power harvesting devices, and/or acoustic transmission devices, are hidden under the plug. These devices may be exposed and/or activated once the dissolvable portion of the plug has dissolved.

Example Sensors

Example sensors and sensing modules for monitoring fluid flow are now described in reference to FIGS. 8-11. FIG. 8 depicts an example EAT sensing module for monitoring flow using a shaped flow obstruction from a partially dissolvable plug, according to some embodiments. With reference to FIG. 1, an EAT sensing module 800 of FIG. 8 may include sensors similar to the sensors 103A-C. The EAT sensing module 800 may also be installed in one or more of the plugs 104A-C (as described above).

The EAT sensing module 800 may comprise one or more sensors, electronics, batteries, and/or acoustic transducers for data transmission to an optical fiber, such as the fiber optic cable 121 of FIG. 1, that is interrogated by a DAS system, such as DAS interrogator 118 of FIG. 1. The EAT sensing module 800 comprises a metal pipe 801, an insulating pipe 802, and electrodes and/or sensors, such as sensor 803. The EAT sensing module 800 may include one or more of the sensors 803. For example, FIG. 8 depicts sixteen sensors. However, any number of sensors may be used. The sensors may be of different type, as previously described in FIG. 4. The sensors in the EAT sensing module 800 may be mechanically configured for specific applications and/or implementations. The EAT sensing module 800 may be implemented with different sensors and different mechanical implementations. Sensing data, raw or processed, is acoustically transmitted from the EAT sensing module 800 and detected using a DAS system interrogating the optical fiber, and then de-coded at the surface to reveal the raw data or the measurand.

In the center of the EAT sensing module 800 is an imaging area 804. The EAT sensing module 800 of FIG. 8 may be an example of one of many EAT sensing module configurations used in a well system, such as the well system of FIG. 1. The EAT sensing module 800 may include one or more of temperature, pressure, differential pressure, acoustic, vibration, accelerometer(s), geophone(s), resistance, capacitance, and chemical sensors. The EAT sensing module 800 may use one of many configurations in combination with partially dissolvable plugs, such as the plugs 104A-C of FIG. 1, exposing venturi type flow meters/flow restrictions. The EAT sensing module 800 may incorporate energy harvesting devices and techniques. The energy harvesting devices (not shown) may be spaced at different positions and configurations (both in distance, orientation, size and shape) in close proximity to the measurement position in order to promote fluid mixing.

The EAT sensing module 800 may also be a pressure sensor configured in a single pressure sensor configuration where two independent pressure measurements are obtained or in a differential pressure configuration. Either configuration can be used with a venturi flow obstruction configuration for flow rate measurements. The flow rate measurements may be augmented by temperature measurements and/or acoustic measurements using single point sensors coupled in the EAT module, DTS measurements, and/or DAS measurements.

When using EAT sensing modules, such as EAT sensing module 800 of FIG. 8, for flow monitoring, challenges with multiphase fluid measurements may include different fluid velocities and flow regimes over depth along the wellbore and over time. FIG. 9 depicts an example system for monitoring a stratified flow structure, according to some embodiments. In stratified flow systems, such as flow system 900 of FIG. 9, fluids in a casing 901 of a wellbore separate due to the different fluid densities, velocities, and flow regimes. For simplicity, FIG. 9 depicts two fluid types, though wellbores may have many fluid types. The fluid is composed of water 903 and oil 902 flowing through the casing 901. In the stratified flow structure, the water 903 stays at the bottom of the casing while the oil 902 rests on top of the water 903. The fluids may mix in the middle, leading to bubbles, such as bubble 904, to form along the mixing line. It may be beneficial to place two or more EAT sensors, such as sensors 905 and 906, at two or more locations and use cross correlation of signals between measurement locations for multi-phase measurements to handle slip between different phases. This allows for measure of travel time of each phase, bubbles, and/or slugs between the sensor locations as lighter fluids and gases travel faster than heavier components.

Figure 10:
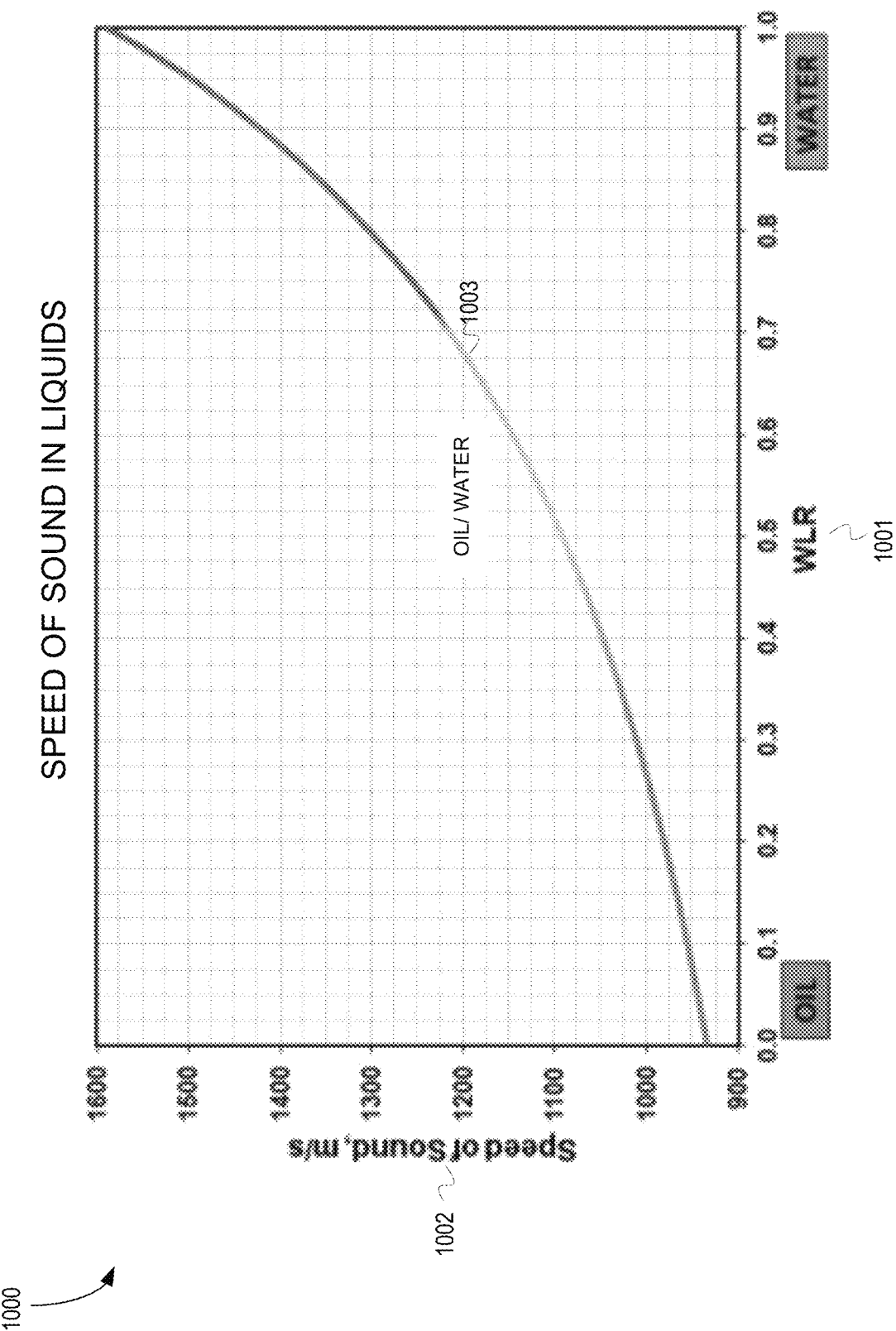
FIG. 10 depicts a graph of speed of sound in liquids, according to some embodiments.

Speed of sound in a liquid may be used to determine the phase fraction of oil to water. FIG. 10 provides an example of how speed of sound changes with respect to the fraction of oil to water. Turbulent flow may generate acoustic signals that may be used for speed of sound measurements whereas active pinging may be better suited for laminar flow and transition regions between laminar to turbulent flow. Accurate speed of sound measurements may require uniform mixing of the phases which may be a challenge in laminar flow conditions which easily may occur in low-rate horizontal wells where fluids may separate. Multiple acoustic velocities may be measured, one for each phase, and signal properties like amplitude or relative amplitudes may be used as an indication of volume fractions. Similarly, gas-liquid ratios may also be determined using speed of sound measurements.

FIG. 10 depicts a graph of speed of sound in liquids, according to some embodiments. Graph 1000 displays the change in speed of sound across liquids ranging from pure oil to pure water. An x-axis 1001 represents the water-in-oil ratio (WLR) while a y-axis 1002 represents the speed of sound in units of m/s. From trendline 1003, it is apparent that the speed of sound increases as fluids transition from purely oil to purely water.

Example Operations

Figure 11:
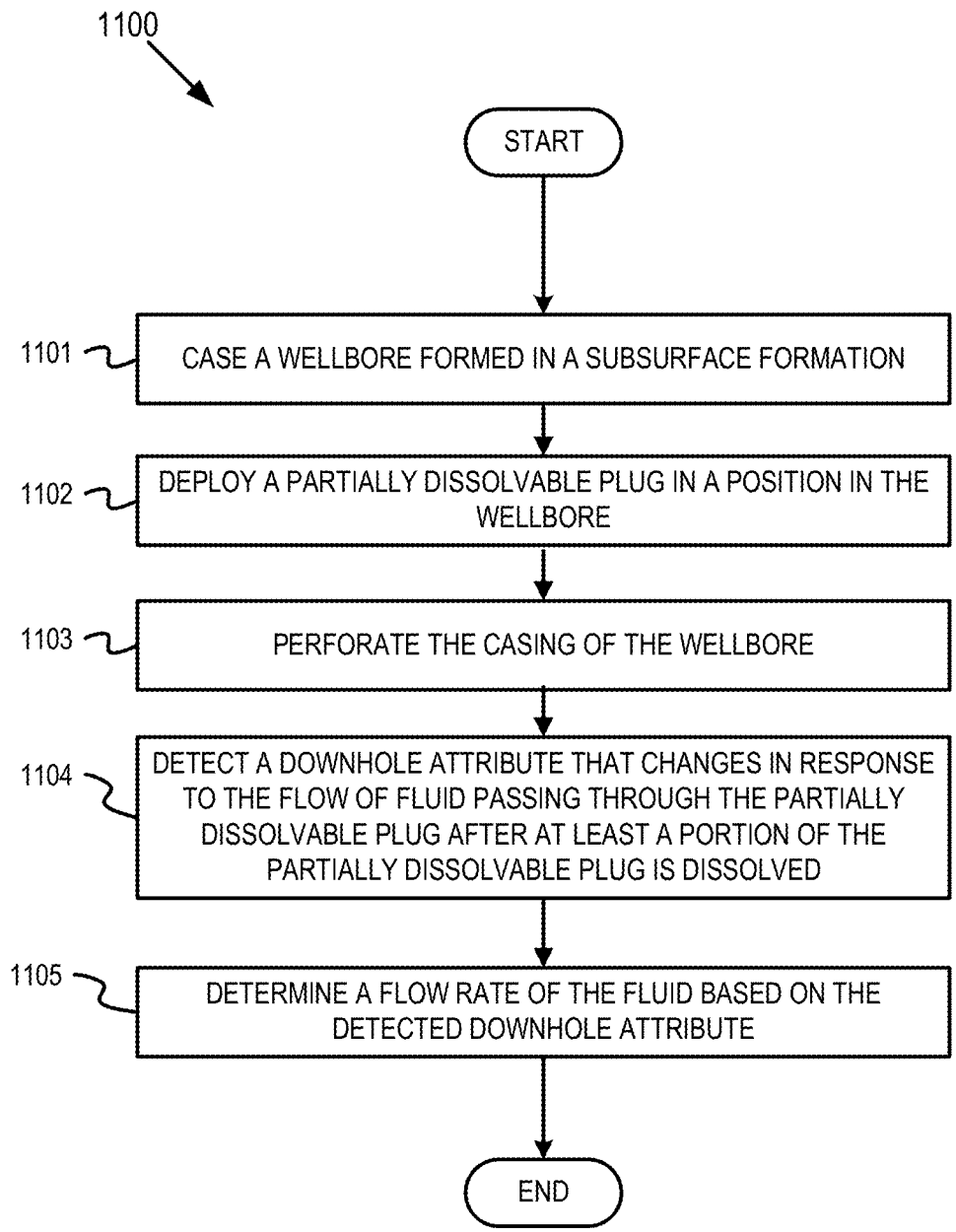
FIG. 11 depicts a flowchart of operations for flow monitoring using a shaped flow obstruction from a partially dissolvable plug, according to some embodiments.

FIG. 11 depicts a flowchart of operations for flow monitoring using a shaped flow obstruction from a partially dissolvable plug, according to some embodiments. Operations of a flowchart 1100 may be implemented with any of the embodiments of FIG. 2, 4-5, or 7 and/or the system of FIG. 1. Operations of the flowchart 1100 begin at block 1101.

At block 1101, a wellbore formed in a subsurface formation is cased. For example, with reference to FIG. 1, the wellbore 101 is drilled into a subterranean hydrocarbon bearing formation. The wellbores are often deviated and may include a horizontal portion. After drilling the wellbore 101, the casing 105 can then be inserted into the wellbore, where the casing 105 can then be cemented in place around the walls of the wellbore 101. The cementing process may be done by pumping cement into the casing 105 where the cement exits the distal end of the casing 105 and moves into the annular space between the casing 105 and the walls of the wellbore 101. Drilling fluids may then return to the surface as the cement is pumped into the casing 105.

At block 1102, a partially dissolvable plug is deployed in a position in the cased wellbore. For example, with reference to FIG. 1, the plugs 104A-104C can be deployed at different positions in the wellbore 101. The plugs may be deployed by pumping a suitable fluid volume into the wellbore 101 to position the plugs 104A-104C at each of their respective positions. Reverse cementing where the cement is pumped into the annular space may also be used in some applications for such deployment.

At block 1103, the casing of the wellbore is perforated. For example, with reference to FIG. 1, the perforations 190A-190V have been made at different depths of the casing 105 and at positions above and below the plugs 104A-104C (as shown). Such perforations can be made as part of hydraulic fracturing operations of the wellbore 101. A hole, or perforation, is created in the casing or lining of the wellbore to connect the wellbore to a reservoir in the subsurface formation. This can create a channel between the pay zone and the wellbore to cause fluids to flow to and from the wellbore easily.

At block 1104, a downhole attribute that changes in response to the flow of fluid passing through the partially dissolvable plug after at least a portion of the partially dissolvable plug is dissolved is detected. For example, with reference to FIG. 1, any sensor positioned in the wellbore 101 can detect the downhole attribute. To illustrate, the fiber optic cable 121, any one of the sensors 103A-103C, a sensor that is part of the non-dissolvable portion of a plug, etc. can detect the downhole attribute. Such sensors can monitor the fluid flow to detect a downhole attribute or property of the fluid flow. For example, the attribute may be a volume, fluid displacement, mass, an acoustic variation, a temperature, a vibration, a strain variation, and/or a pressure variation. After the dissolution of the dissolvable portion of the plug, the fluid can travel through the shaped flow obstruction, which can cause changes in the properties of the fluid. For example, when the shaped flow obstruction is a Venturi tube, the restriction at the throat can create an increase in fluid velocity which can cause a decrease in fluid pressure at the throat. Also, multiple sensors may be used to detect changes in fluid properties at different locations in the wellbore.

Other types of sensors may include surface and downhole pressure sensors, where the pressure sensors may be capable of collecting data at rates up to 2,000 Hz or even higher. Multi-point fiber optic pressure sensors measuring the fluid pressure inside the casing and/or outside the casing may be deployed. Pressure sensing locations may be selected such that pressure is measured at or between fluid inflow points/perforation clusters, and/or between or in a region of flow disturbance inside the casing. The fiber optic cables may house one or several optical fibers and the optical fibers may be single mode fibers, multi-mode fibers or a combination of single mode and multi-mode optical fibers. The fiber optic sensing systems connected to the optical fibers may include Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber/cable, or single point sensing systems where the sensors are located at the end of the cable.

At block 1105, a flow rate of the fluid is determined based on the detected downhole attribute. For example, with reference to FIG. 1, the processor 109 can receive the detected downhole attribute from downhole and determine the flow rate of the fluid based on this detected downhole attribute. To illustrate, the processor 109 can determine the flow rate based on measured fluid properties. For example, when the detected downhole attribute is a volume, the fluid flow rate may be calculated using the volume per unit time. In another example, when the detected downhole attribute is a velocity, the fluid flow rate may be calculated using the area and the velocity. With reference to FIG. 3, the area is a known value that can be looked up or determined from D and/or d. Additionally, in some embodiments, the determined flow rate may be used to model flow measurements.

FIG. 11 is annotated with a series of numbers. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The flowchart is provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. The program code may be executed manually, on demand or automated in a closed loop mode with periodic updates, notifications and/or exception-based notifications once certain defined thresholds are exceeded. Thresholds may be defined as specific absolute values, percentage values, rate of change values, specific patterns or series of patterns where thresholds may be applied to raw measured data and/or post processed data and/or data filtered in frequency and/or time domains in one or more combinations of said data. The program code may be executed locally on computers or processors at the well site and may communicate with remote software applications through various wired or wireless communication mechanisms where data and communication with users are enabled through local, global or cloud-based services interacting with computers and/or handheld personal devices.

Example System Applications

Figure 12:
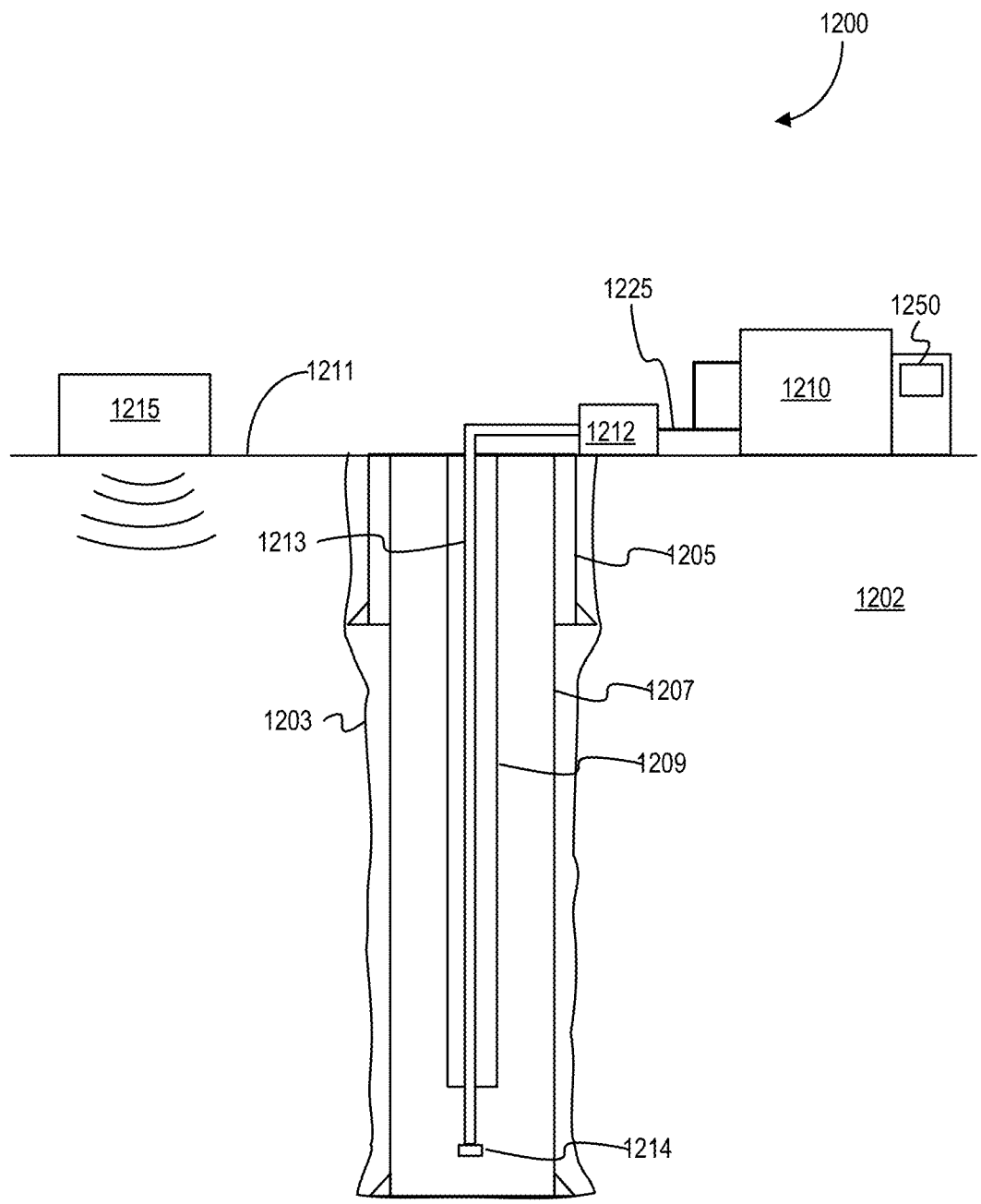
FIG. 12 depicts a simultaneous DAS signal acquisition system connected to an optical fiber within the tubing of a cased wellbore, according to some embodiments.
Figure 13:
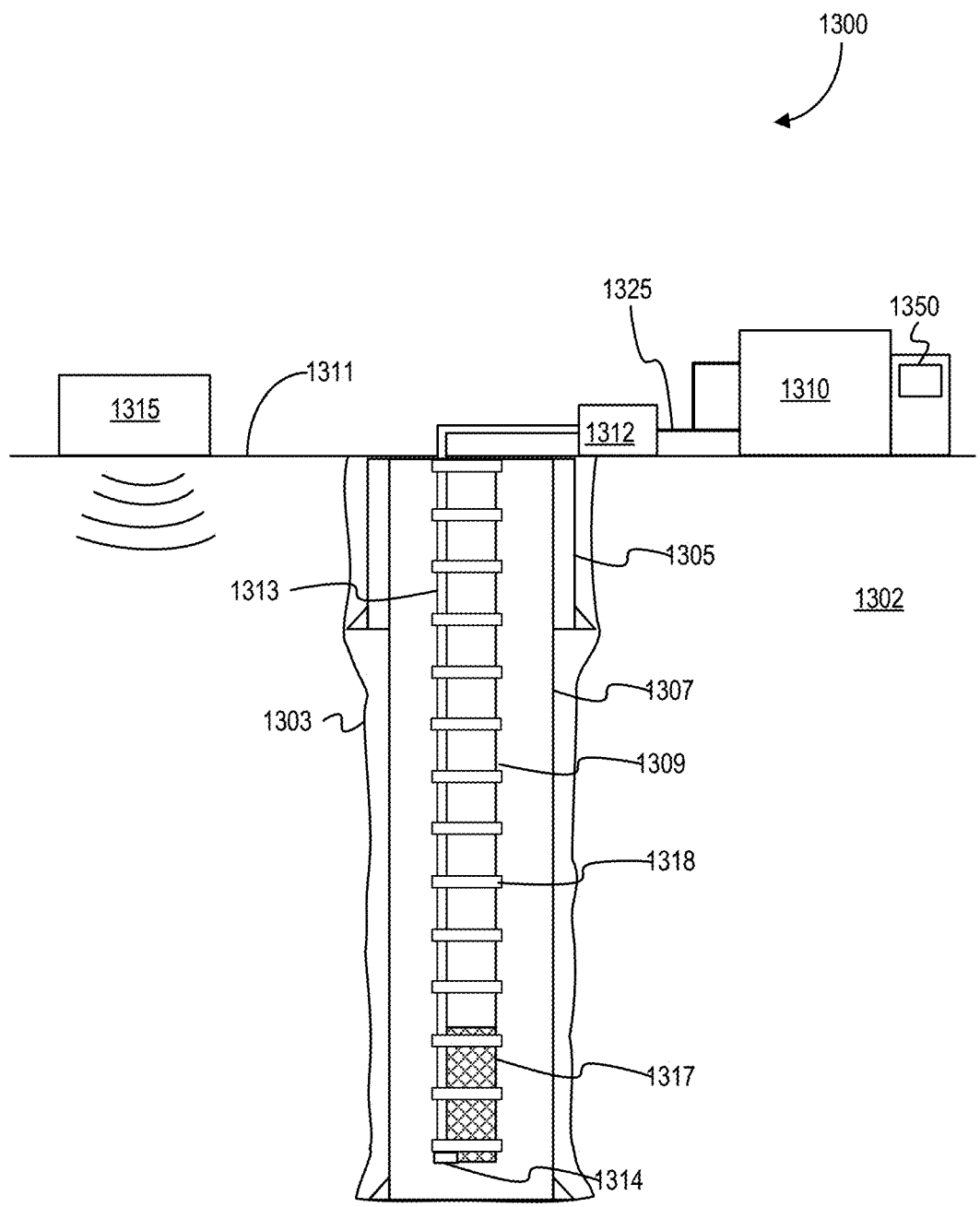
FIG. 13 depicts a simultaneous DAS signal acquisition system connected to an optical fiber fixed to the outside of the tubing of a cased wellbore, according to some embodiments.
Figure 14:
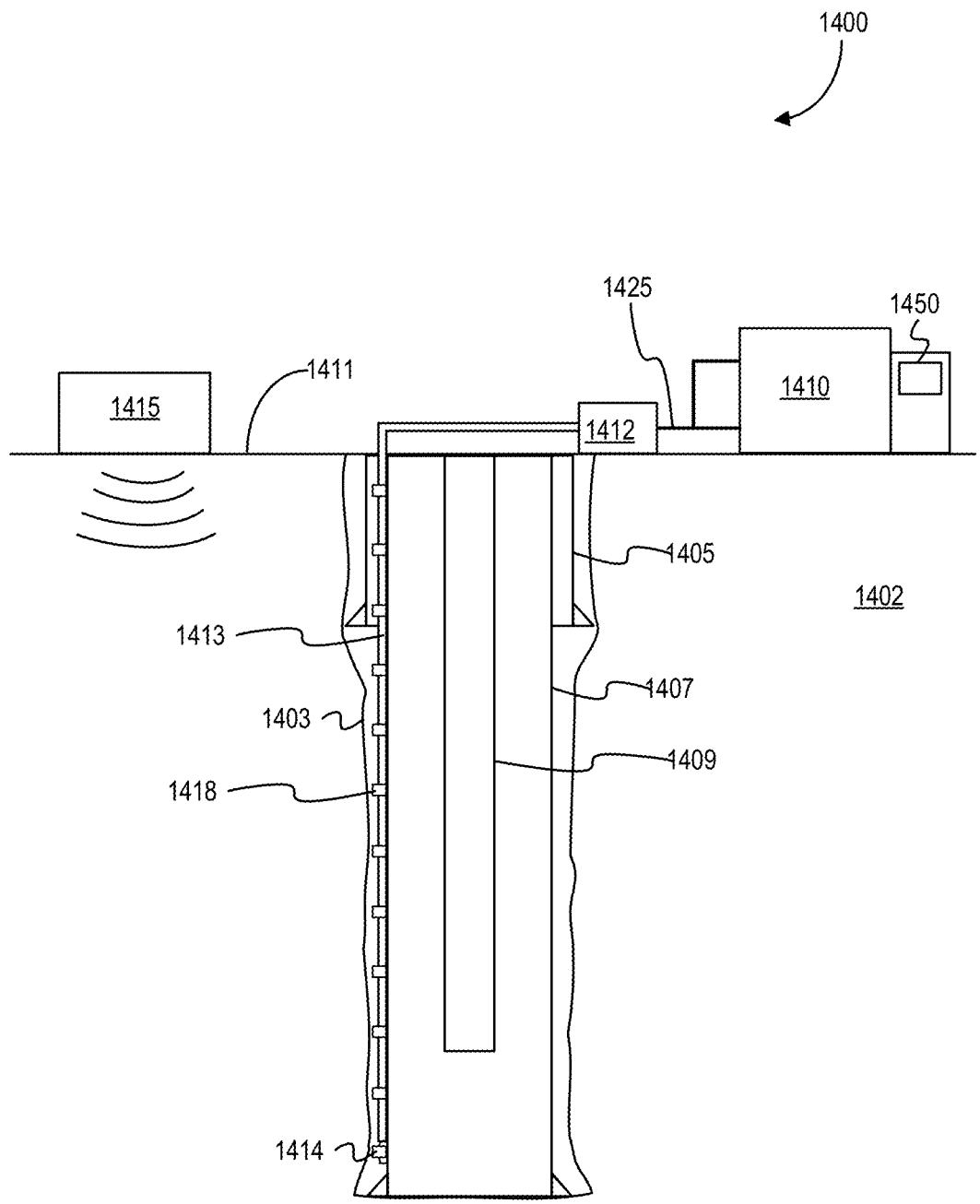
FIG. 14 depicts a simultaneous DAS signal acquisition system connected to an optical fiber fixed to the outside of the production casing of a cased wellbore, according to some embodiments.

Example system applications in which the partially dissolvable plugs can be incorporated are now described. FIGS. 12-14 depict examples of DAS signal acquisition systems, such as the DAS system described in FIG. 1. While FIGS. 12-14 depict an example of a DAS signal acquisition system in a single well, these systems may also be applied to a multi-well system.

FIG. 12 depicts a simultaneous DAS signal acquisition system connected to an optical fiber within the tubing of a cased wellbore, according to some embodiments. A wellbore 1203 in the subterranean formation 1202 includes a DAS system 1200 that can detect seismic disturbances generated by a seismic source 1215 on an earth surface 1211. The wellbore 1203 is a completion well (i.e., a well ready for production or injection following a drilling process) having a surface casing 1205, a production casing 1207 inside the surface casing 1205, and a tubing 1209 inside the production casing 1207. In some embodiments, the tubing 1209 can be a casing string, production string, an armored wireline, a slickline, a coiled tubing, a work string, etc. The DAS system 1200 includes an optical fiber 1213 in the tubing 1209 and a DAS signal acquisition system 1212 that includes a DAS interrogator.

The DAS interrogator in the DAS signal acquisition system 1212 is directly coupled to the optical fiber 1213. Alternatively, the DAS interrogator can be coupled to a fiber stretcher module in the DAS signal acquisition system 1212, wherein the fiber stretcher module is coupled to the optical fiber 1213. The DAS signal acquisition system 1212 can receive DAS measurement values taken and/or transmitted along the length of the optical fiber 1213. In addition, the DAS signal acquisition system 1212 can receive DAS measurement values from a bottom hole gauge carrier 1214 that transmits measurements through the optical fiber 1213. In some embodiments, the bottom hole gauge carrier 1214 can include a pressure temperature gauge and can be inside of or replaced by a wireline scanning tool.

DAS measurement values transmitted through the optical fiber 1213 can be sent to the DAS signal acquisition system 1212 at the surface. The DAS interrogator of the DAS signal acquisition system 1212 can be electrically connected to a digitizer to convert optically transmitted measurements into digitized measurements. A computing device 1210 can collect the electrically transmitted measurements from the DAS signal acquisition system 1212 using a connector 1225. The computing device can have one or more processors and a memory device to analyze the measurements and graphically represent analysis results on the display device 1250. In addition, the computing device 1210 can communicate with components attached to the optical fiber 1213. For example, the computing device 1210 can send control signals to the bottom hole gauge carrier 1214 to modify gauge measurement parameters. Additionally, in some embodiments, at least one processor and memory device can be located downhole for the same purposes. With the optical fiber 1213 positioned inside a portion of the wellbore 1203, the DAS signal acquisition system 1212 can obtain information associated with the subterranean formation 1202 based on seismic/acoustic disturbances (e.g., seismic disturbances and/or formation reflections caused by signals from the seismic source 1215). Relative to other positions, fixing the optical fiber 1213 to the outer perimeter of the tubing 1209 can increase the sensitivity of DAS measurements to changes in the annular region between the production casing 1207 and the tubing 1209. (e.g., changes in fluid flow down the tubing 1209, changes in fluid composition down the tubing 1209, etc.).

FIG. 13 depicts a simultaneous DAS signal acquisition system connected to an optical fiber fixed to the outside of the tubing of a cased wellbore, according to some embodiments. A wellbore 1303 in the subterranean formation 1302 includes a DAS system 1300 that can detect seismic disturbances generated by a seismic source 1315 on an earth surface 1311. The wellbore 1303 can be a completion well (i.e., a well ready for production or injection following a drilling process) having a surface casing 1305, a production casing 1307 inside the surface casing 1305, and a tubing 1309 inside the production casing 1307. In some embodiments, the tubing 1309 can be a casing string, production string, an armored wireline, a slickline, a coiled tubing, a work string, etc. The DAS system 1300 includes an optical fiber 1313 that is fixed to the outer perimeter of the tubing 1309. Cross-coupling protectors such as a cross-coupling protector 1318 can be used to fix the optical fiber 1313 to the tubing 1309. In addition, a tubing tail 1317 can also be fixed to the optical fiber 1313 and extend below the bottom of the tubing 1309. One or more flow altering devices can be placed inside the tubing 1309 using wireline or coil deployment methods in order to generate flow disturbances that can be measured with the DAS system.

In some embodiments, the optical fiber can be connected to a DAS signal acquisition system 1312 that includes a DAS interrogator. The DAS interrogator in the DAS signal acquisition system 1312 can be directly coupled to the optical fiber 1313. Alternatively, the DAS interrogator can be coupled to a fiber stretcher module in the DAS signal acquisition system 1312, wherein the fiber stretcher module is coupled to the optical fiber 1313. The DAS signal acquisition system 1312 can receive DAS measurement values taken and/or transmitted along the length of the optical fiber 1313. In addition, the DAS signal acquisition system 1312 can receive DAS measurement values from a bottom hole gauge carrier 1314 that transmits measurements through the optical fiber 1313. In some embodiments, the bottom hole gauge carrier 1314 can include a pressure temperature gauge and can be inside of or replaced by a wireline tool.

DAS measurement values transmitted through the optical fiber 1313 can be sent to the DAS signal acquisition system 1312 at the surface. The DAS interrogator of the DAS signal acquisition system 1312 can be electrically connected to a digitizer to convert optically transmitted measurements into digitized measurements. A computing device 1310 can collect the electrically transmitted measurements from the DAS signal acquisition system 1312 using a connector 1325. The computing device can have one or more processors and a memory device to analyze the measurements and graphically represent analysis results on the display device 1350. In addition, the computing device 1310 can communicate with components attached to the optical fiber 1313. For example, the computing device 1310 can send control signals to the bottom hole gauge carrier 1314 to modify gauge measurement parameters. Additionally, in some embodiments, at least one processor and memory device can be located downhole for the same purposes. With the optical fiber 1313 positioned inside a portion of the wellbore 1303, the DAS signal acquisition system 1312 can obtain information associated with the subterranean formation 1302 based on seismic/acoustic disturbances (e.g., seismic disturbances caused by the seismic source 1315). Relative to other positions, fixing the optical fiber 1313 to the outer perimeter of the tubing 1309 can increase the sensitivity of DAS measurements to changes in the annular region between the production casing 1307 and the tubing 1309.

FIG. 14 depicts a simultaneous DAS signal acquisition system connected to an optical fiber fixed to the outside of the production casing of a cased wellbore, according to some embodiments. A wellbore 1403 in the subterranean formation 1402 includes a DAS system 1400 that can detect seismic disturbances generated by a seismic source 1415 on an earth surface 1411. The wellbore 1403 can be a completion well (i.e., a well ready for production or injection following a drilling process) having a surface casing 1405, a production casing 1407 inside the surface casing 1405, and a tubing 1409 inside the production casing 1407. In some embodiments, the tubing 1409 can be a casing string, production string, an armored wireline, a slickline, a coiled tubing, a work string, etc. The DAS system 1400 includes an optical fiber 1413 that is fixed to the outer perimeter of the production casing 1407. Cross-coupling protectors such as a cross-coupling protector 1418 can be used to fix the optical fiber 1413 to the outer perimeter of the production casing 1407. One or more flow altering devices can be placed inside the tubing 1409 using wireline or coil deployment methods in order to generate flow disturbances that can be measured with the DAS system.

In some embodiments, the optical fiber can be connected to a DAS signal acquisition system 1412 that includes a DAS interrogator. The DAS interrogator in the DAS signal acquisition system 1412 can be directly coupled to the optical fiber 1413. Alternatively, the DAS interrogator can be coupled to a fiber stretcher module in the DAS signal acquisition system 1412, wherein the fiber stretcher module is coupled to the optical fiber 1413. The DAS signal acquisition system 1412 can receive DAS measurement values taken and/or transmitted along the length of the optical fiber 1413. In addition, the DAS signal acquisition system 1412 can receive DAS measurement values from a bottom hole gauge carrier 1414 that transmits measurements through the optical fiber 1413. In some embodiments, the bottom hole gauge carrier 1414 can include a pressure temperature gauge and can be inside of or replaced by a wireline tool, etc.

DAS measurement values transmitted through the optical fiber 1413 can be sent to the DAS signal acquisition system 1412 at the surface. The DAS interrogator of the DAS signal acquisition system 1412 can be electrically connected to a digitizer to convert optically transmitted measurements into digitized measurements. A computing device 1410 can collect the electrically transmitted measurements from the DAS signal acquisition system 1412 using a connector 1425. The computing device can have one or more processors and a memory device to analyze the measurements and graphically represent analysis results on the display device 1450. In addition, the computing device 1410 can communicate with components attached to the optical fiber 1413. For example, the computing device 1410 can send control signals to the bottom hole gauge carrier 1414 to modify gauge measurement parameters. Additionally, in some embodiments, at least one processor and memory device can be located downhole for the same purposes. With the optical fiber 1413 positioned inside a portion of the wellbore 1403, the DAS signal acquisition system 1412 can obtain information associated with the subterranean formation 1402 based on seismic/acoustic disturbances (e.g., seismic disturbances caused by the seismic source 1415). Relative to other positions, fixing the optical fiber 1413 to the outer perimeter of the production casing 1407 can increase the sensitivity of DAS measurements to changes in the formation.

While the aspects of the disclosure are described with reference to various implementations and exploitations, it will be understood that these aspects are illustrative and that the scope of the claims is not limited to them. In general, techniques for flow monitoring as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As will be appreciated, aspects of the disclosure may be embodied as a system, method or program code/instruction stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

An apparatus comprises a partially dissolvable plug to be deployed in a position in a wellbore formed in a subsurface formation. The partially dissolvable plug comprises a first portion comprising a dissolvable material that is to dissolve over time after exposure to a downhole ambient environment in the wellbore. The first portion is to prevent a flow of fluid from downhole to a surface of the wellbore until at least a portion of the dissolvable material is dissolved. The partially dissolvable plug comprises a second portion comprising a non-dissolvable material that is to create a flow restriction of the flow of fluid as the flow of fluid passes through the partially dissolvable plug. A flow rate of the flow of the fluid is to be determined based on a detected change in a downhole attribute that is to change in response to the flow of fluid passing through the partially dissolvable plug after being deployed in the position in the wellbore and after at least a portion of the partially dissolvable plug is dissolved.

The partially dissolvable plug comprises at least one sensor to detect the change in the downhole attribute.

At least one sensor is to detect the change in the downhole attribute, wherein the at least one sensor comprises at least one of an electro-acoustic technology (EAT) sensor, a distributed acoustic sensing (DAS) sensor, a distributed strain sensing (DSS) sensor, a distributed temperature sensing (DTS) sensor, and a pressure sensor, and a fiber optic sensor.

The change in the downhole attribute comprises at least one of an acoustic variation, a pressure variation, a temperature variation, a vibration, and a strain variation generated in response to the flow of fluid passing through the partially dissolvable plug.

The second portion comprises a Venturi tube.

The first portion comprises a dissolvable ball. The dissolvable ball is positioned at one end of the second portion to prevent the flow of fluid through the partially dissolvable prior to dissolution of the dissolvable ball and allows the flow of fluid after dissolution of the dissolvable ball.

The partially dissolvable plug comprises an anchoring device positioned adjacent to the second portion. The anchoring device is to anchor the second portion and to isolate at least a part of the second portion from the fluid.

The partially dissolvable plug comprises at least one fiber optic mounting port to receive a fiber optic cable proximate to the partially dissolvable plug to detect the change in the downhole attribute.

A method comprises casing a wellbore formed in a subsurface formation, deploying a partially dissolvable plug in a position in the wellbore, perforating the casing to create a hole in the casing, wherein a flow of fluid is to move to a surface of the wellbore, detecting a downhole attribute that changes in response to the flow of fluid passing through the partially dissolvable plug after at least a portion of the partially dissolvable plug is dissolved, and determining a flow rate of the flow based on the detected downhole attribute.

A shaped flow obstruction is created in the flow of fluid in response to the at least the portion of the partially dissolvable plug is dissolved. Detecting the downhole attribute comprises detecting the downhole attribute that changes in response to creation of the shaped flow obstruction.

Detecting the downhole attribute comprises detecting at least one of an acoustic variation, a pressure variation, a temperature variation, a vibration, and a strain variation.

The partially dissolvable plug comprises a dissolvable material that dissolves over time after exposure to a downhole ambient environment, wherein the partially dissolvable plug is to prevent the flow of fluid until dissolving of the dissolvable material, and a non-dissolvable material that creates a flow restriction of the flow of fluid as the flow of fluid passes through the partially dissolvable plug after dissolving of the dissolvable material.

A system comprises a partially dissolvable plug to be deployed in a position in a wellbore formed in a subsurface formation. The partially dissolvable plug comprises a first portion comprising a dissolvable material that is to dissolve over time after exposure to a downhole ambient environment in the wellbore, wherein the first portion is to prevent a flow of fluid from downhole to a surface of the wellbore until at least a portion of the dissolvable material is dissolved, and a second portion comprising a non-dissolvable material that is to create a flow restriction of the flow of fluid as the flow of fluid passes through the partially dissolvable plug. At least one sensor is to detect a change in a downhole attribute that is to change in response to the flow of fluid passing through the partially dissolvable plug after being deployed in the position in the wellbore and after at least a portion of the partially dissolvable plug is dissolved. The system comprises a processor and a computer-readable medium having instructions stored thereon that are executable by the processor to cause the system to determine a flow rate of the fluid based on the detected downhole attribute.

The at least one sensor comprises at least one of an electro-acoustic technology (EAT) sensor, a distributed acoustic sensing (DAS) sensor, a distributed strain sensing (DSS) sensor, a distributed temperature sensing (DTS) sensor, a fiber optic sensor, and a pressure sensor.

The change in the downhole attribute comprises at least one of an acoustic variation, a pressure variation, a temperature variation, a vibration, and a strain variation generated in response to the flow of fluid passing through the partially dissolvable plug.

The second portion comprises a Venturi tube.

The first portion comprises a dissolvable ball. The dissolvable ball is positioned at one end of the second portion to prevent the flow of fluid through the partially dissolvable prior to dissolution of the dissolvable ball and allows the flow of fluid after dissolution of the dissolvable ball.

The partially dissolvable plug comprises an anchoring device positioned adjacent to the second portion. The anchoring device is to anchor the second portion and to isolate at least a part of the second portion from the fluid.

The partially dissolvable plug comprises at least one fiber optic mounting port to receive a fiber optic cable proximate to the partially dissolvable plug to detect the change in the downhole attribute.

The partially dissolvable plug and one or more additional partially dissolvable plugs are to be deployed by at least one of a wireline, a slickline, and a coiled tubing, wherein the partially dissolvable plug and the one or more additional partially dissolvable plugs are retrievable from the wellbore after a hydraulic fracturing operation.

The invention claimed is:
1. An apparatus comprising:
a partially dissolvable plug to be deployed in a position in a wellbore formed in a subsurface formation, the partially dissolvable plug comprising,
a first portion comprising a dissolvable material that is to dissolve over time after exposure to a downhole ambient environment in the wellbore, wherein the first portion is to prevent a flow of fluid from downhole to a surface of the wellbore until at least a portion of the dissolvable material is dissolved; and
a second portion comprising a non-dissolvable material configured to cause a detectable disturbance of the flow of fluid passing through the partially dissolvable plug,
at least one sensor positioned proximate to the second portion to detect the detectable disturbance caused by the flow of fluid passing through the second portion after the first portion is at least partially dissolved.

2. The apparatus of claim 1, wherein the at least one sensor comprises at least one of an electro-acoustic technology (EAT) sensor, a distributed acoustic sensing (DAS) sensor, a distributed strain sensing (DSS) sensor, a distributed temperature sensing (DTS) sensor, and a pressure sensor, and a fiber optic sensor.

3. The apparatus of claim 1, wherein the detectable disturbance comprises at least one of an acoustic variation, a pressure variation, a temperature variation, a vibration, and a strain variation generated in response to the flow of fluid passing through the partially dissolvable plug.

4. The apparatus of claim 1, wherein the second portion comprises a Venturi tube.

5. The apparatus of claim 1, wherein the first portion comprises a dissolvable ball, wherein the dissolvable ball is positioned at one end of the second portion to prevent the flow of fluid through the partially dissolvable plug prior to dissolution of the dissolvable ball and allows the flow of fluid after dissolution of the dissolvable ball.

6. The apparatus of claim 1, wherein the partially dissolvable plug comprises an anchoring device positioned adjacent to the second portion, the anchoring device to anchor the second portion and to isolate at least a part of the second portion from the fluid.

7. The apparatus of claim 1, wherein the partially dissolvable plug comprises at least one fiber optic mounting port to receive a fiber optic cable proximate to the partially dissolvable plug to detect the detectable disturbance.

8. The apparatus of claim 4, wherein the at least one sensor is proximate to a throat of the Venturi tube.

9. A method comprising:
casing a wellbore formed in a subsurface formation;
deploying a partially dissolvable plug in a position in the wellbore;
perforating the casing to create a hole in the casing, wherein a flow of fluid is to move to a surface of the wellbore;
deploying a partially dissolvable plug in a position in the wellbore, wherein the partially dissolvable plug comprises a dissolvable material and a non-dissolvable material;
detecting, with at least one sensor positioned proximate to the non-dissolvable material, a detectable disturbance in the flow of fluid passing through the non-dissolvable material after at least a portion of the dissolvable material of the partially dissolvable plug is dissolved, wherein the non-dissolvable material of the partially dissolvable plug is configured to cause the detectable disturbance of the flow of fluid; and
determining a flow rate of the fluid based on the detected detectable disturbance.

10. The method of claim 9,
wherein the non-dissolvable material of the partially dissolvable plug comprises a shaped flow obstruction created in the flow of fluid in response to the at least the portion of the partially dissolvable plug is dissolved, and wherein detecting the detectable disturbance comprises detecting the detectable disturbance in response to creation of the shaped flow obstruction.

11. The method of claim 9, wherein detecting the detectable disturbance comprises detecting at least one of an acoustic variation, a pressure variation, a temperature variation, a vibration, and a strain variation.

12. The method of claim 9, wherein
the dissolvable material dissolves over time after exposure to a downhole ambient environment, wherein the partially dissolvable plug is to prevent the flow of fluid until dissolving of the dissolvable material; and
the non-dissolvable material creates a flow restriction of the fluid as the fluid passes through the partially dissolvable plug after dissolving of the dissolvable material.

13. A system comprising:
a partially dissolvable plug to be deployed in a position in a wellbore formed in a subsurface formation, the partially dissolvable plug comprising,
a first portion comprising a dissolvable material that is to dissolve over time after exposure to a downhole ambient environment in the wellbore, wherein the first portion is to prevent a flow of fluid from downhole to a surface of the wellbore until at least a portion of the dissolvable material is dissolved; and
a second portion comprising a non-dissolvable material configured to cause a detectable disturbance of the flow of fluid passing through the partially dissolvable plug;
at least one sensor positioned proximate to the second portion to detect the detectable disturbance caused by the flow of fluid passing through the second portion after the first portion is at least partially dissolved;
a processor; and
a computer-readable medium having instructions stored thereon that are executable by the processor to cause the system to,
determine a flow rate of the fluid based on the detected detectable disturbance.

14. The system of claim 13, wherein the at least one sensor comprises at least one of an electro-acoustic technology (EAT) sensor, a distributed acoustic sensing (DAS) sensor, a distributed strain sensing (DSS) sensor, a distributed temperature sensing (DTS) sensor, a fiber optic sensor, and a pressure sensor.

15. The system of claim 13, wherein the detectable disturbance comprises at least one of an acoustic variation, a pressure variation, a temperature variation, a vibration, and a strain variation generated in response to the flow of fluid passing through the partially dissolvable plug.

16. The system of claim 13, wherein the second portion comprises a Venturi tube.

17. The system of claim 13, wherein the first portion comprises a dissolvable ball, wherein the dissolvable ball is positioned at one end of the second portion to prevent the flow of fluid through the partially dissolvable plug prior to dissolution of the dissolvable ball and allows the flow of fluid after dissolution of the dissolvable ball.

18. The system of claim 13, wherein the partially dissolvable plug comprises an anchoring device positioned adjacent to the second portion, the anchoring device to anchor the second portion and to isolate at least a part of the second portion from the fluid.

19. The system of claim 13, wherein the partially dissolvable plug comprises at least one fiber optic mounting port to receive a fiber optic cable proximate to the partially dissolvable plug to detect the detectable disturbance.

20. The system of claim 13, wherein the partially dissolvable plug and one or more additional partially dissolvable plugs are to be deployed by at least one of a wireline, a slickline, and a coiled tubing, wherein the partially dissolvable plug and the one or more additional partially dissolvable plugs are retrievable from the wellbore after a hydraulic fracturing operation.

* * * * *